US007957721B2

(12) United States Patent
Hogan et al.

(10) Patent No.: US 7,957,721 B2
(45) Date of Patent: Jun. 7, 2011

(54) COORDINATED SUBSCRIBER ACCESS HANDLING FOR SHARED NETWORK SUPPORT

(75) Inventors: Billy Hogan, Dublin (IE); Erik Slotboom, VS Neede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1965 days.

(21) Appl. No.: 10/068,001

(22) Filed: Feb. 8, 2002

(65) Prior Publication Data

US 2002/0111180 A1    Aug. 15, 2002

Related U.S. Application Data

(60) Provisional application No. 60/329,503, filed on Oct. 17, 2001, provisional application No. 60/330,708, filed on Oct. 29, 2001, provisional application No. 60/268,065, filed on Feb. 13, 2001, provisional application No. 60/301,442, filed on Jun. 29, 2001.

(51) Int. Cl.
*H04M 1/66* (2006.01)
(52) U.S. Cl. .................. 455/411; 455/422.1; 455/432.1; 455/432.3; 455/435.1
(58) Field of Classification Search .................. 455/517, 455/518, 432, 435, 433, 507, 519, 435.1, 455/435.2, 411, 410, 422.1, 432.1, 432.3, 455/432.2; 379/58, 59, 60, 161, 184, 194; 370/329, 331, 335, 230, 229, 235, 247–250; 380/247–250
See application file for complete search history.

(56) References Cited

U.S. PATENT DOCUMENTS 5,276,907 A     1/1994 Meidan
(Continued)

FOREIGN PATENT DOCUMENTS

EP          0 888 026 A2    12/1998
(Continued)

OTHER PUBLICATIONS

U.S. Appl. No. 60/282,486, filed Apr. 10, 2001 entitled "Commanding Handover Between Differing Radio Access Technologies".
(Continued)

*Primary Examiner* — Ajit Patel
*Assistant Examiner* — Khai M Nguyen
(74) *Attorney, Agent, or Firm* — Nixon & Vanderhye, P.C.

(57) ABSTRACT

To facilitate, e.g., determination of access rights in a shared network context, a telecommunications network transmits, in a broadcast channel over an air interface, an access group eligibility message to a user equipment unit. The access group eligibility message enables the user equipment unit to ascertain, on a basis of access group to which the user equipment unit belongs, whether the user equipment unit is eligible to operate in a cell for which the access group eligibility message is transmitted. The telecommunications network also includes a core network node which, classifies the user equipment unit in at least one of plural access groups. Further, the core network node generates an access group classification message which advises the user equipment unit as to which of the plural access groups the user equipment unit belongs. Upon receipt of the access group classification message, the user equipment unit stores an access group classification obtained from the access group classification message in a memory at the user equipment unit. An access controller of the user equipment unit (upon receiving the access group eligibility message) compares the stored access group classification with contents of the access group eligibility message to determine whether the user equipment unit is allowed access to the cell for which the access group eligibility message is transmitted.

46 Claims, 15 Drawing Sheets

U.S. PATENT DOCUMENTS

| | | | |
|---|---|---|---|
| 5,345,467 A | 9/1994 | Lomp et al. | |
| 5,425,029 A | 6/1995 | Hluchyj et al. | |
| 5,640,414 A | 6/1997 | Blakeney, II et al. | |
| 5,771,275 A | 6/1998 | Brunner et al. | |
| 5,845,203 A | 12/1998 | LaDue | |
| 5,862,480 A * | 1/1999 | Wild et al. | 455/432.2 |
| 5,870,427 A | 2/1999 | Tiedemann, Jr. et al. | |
| 5,873,036 A | 2/1999 | Vucetic | |
| 5,903,832 A | 5/1999 | Seppanen et al. | |
| 5,920,818 A | 7/1999 | Robert et al. | |
| 5,949,770 A * | 9/1999 | Liu et al. | 370/329 |
| 5,995,823 A * | 11/1999 | Stephens | 455/410 |
| 5,999,811 A | 12/1999 | Mölne | |
| 6,018,522 A * | 1/2000 | Schultz | 725/86 |
| 6,073,023 A * | 6/2000 | Tirabassi et al. | 455/518 |
| 6,081,708 A * | 6/2000 | Vasnier | 455/426.1 |
| 6,119,003 A * | 9/2000 | Kukkohovi | 455/435.2 |
| 6,128,490 A | 10/2000 | Shaheen et al. | |
| 6,141,347 A * | 10/2000 | Shaughnessy et al. | 370/390 |
| 6,334,052 B1 * | 12/2001 | Nordstrand | 455/411 |
| 6,370,378 B1 * | 4/2002 | Yahagi | 455/433 |
| 6,560,455 B2 * | 5/2003 | Amin et al. | 455/432.3 |
| 6,690,649 B1 * | 2/2004 | Shimada | 370/238 |
| 6,725,056 B1 * | 4/2004 | Moles et al. | 455/524 |
| 6,792,283 B1 * | 9/2004 | Roberts et al. | 455/525 |
| 6,889,040 B1 * | 5/2005 | Koo et al. | 455/418 |
| 7,184,771 B1 * | 2/2007 | Mouly et al. | 455/450 |
| 2002/0089929 A1 * | 7/2002 | Tallegas et al. | 370/230 |
| 2002/0089960 A1 * | 7/2002 | Shuster | 370/338 |
| 2002/0147024 A1 * | 10/2002 | Wan | 455/515 |
| 2003/0003909 A1 * | 1/2003 | Keronen et al. | 455/434 |

FOREIGN PATENT DOCUMENTS

| | | | |
|---|---|---|---|
| EP | 0888026 A2 * | 12/1998 | |
| EP | 1 041 846 A | 10/2000 | |
| GB | 2315193 | * | 7/1996 |
| GB | 2 315 193 A | 1/1998 | |
| WO | 95/15665 | 6/1995 | |
| WO | 98/06226 | 2/1998 | |
| WO | WO 98/30056 | * | 7/1999 |
| WO | 99/67902 | 12/1999 | |

OTHER PUBLICATIONS

ITU-T Recommendation Q.2630.1, Series Q: Switching and Signalling, Broadband ISDN—Common Aspects of B-ISDN Application Protocols for Access Signalling and Network Signalling and Interworking, AAL Type 2 Signalling Protocol—Capability Set 1, Dec. 1999.

3GPP TS 25.304, V3.9.0 (Dec. 2001); $3^{rd}$ Generation Partnership Project; Tech. Spec. Group Radio Access Network; UE Procedures in Idle Mode and Procedures for Cell Reselection in Connected Mode (Release 1999).

3GPP TS 24.008, V10.0 (Dec. 2001), $3^{rd}$ Generation Partnership Project; Tech. Spec. Group Core Network; Mobile Radio Interface Layer 3 Specification; Core Network Protocols—Stage 3 (Release 1999).

3GPP TS 25.331, V3.6.0 (Mar. 2001), $3^{rd}$ Generation Partnership Project; Tech. Spec. Group Radio Access Network; RRC Protocol Specification (Release 1999).

U.S. Appl. No. 09/286,471, filed Apr. 6, 1999 entitled "Inter-System Handover—Generic Handover Mechanism".

Antipolis, S., "UE-UTRAN Radio Interface Protocol Architecture; Stage 2;" European Telecommunications Standards Institute, UMTS YY.01, V1.0.0, Dec. 1998, pp. 1-39.

Antipolis, S., UMTS Terrestrial Radio Access Network (UTRAN); UTRA FDD; (UMTS XX.03 V1.3.1), European Telecommunications Standards Institute, Feb. 1999, pp. 1-23.

U.S. Appl. No. 09/932,447, filed Aug. 20, 2001 entitled "Shared Network Support Over the 3GPP IUR Interface".

U.S. Appl. No. 10/068,012, filed Feb. 8, 2002, entitled "Handover In A Shared Radio Access Network Environment Using Subscriber Dependent Neighbor Cell Lists".

U.S. Appl. No. 10/068,000, filed Feb. 8, 2002, entitled "Partial Support of Mobility Between Radio Access Networks".

U.S. Appl. No. 09/852,915, filed May 11, 2001 entitled "Releasing Plural Radio Connections with Omnbus Release Message".

* cited by examiner

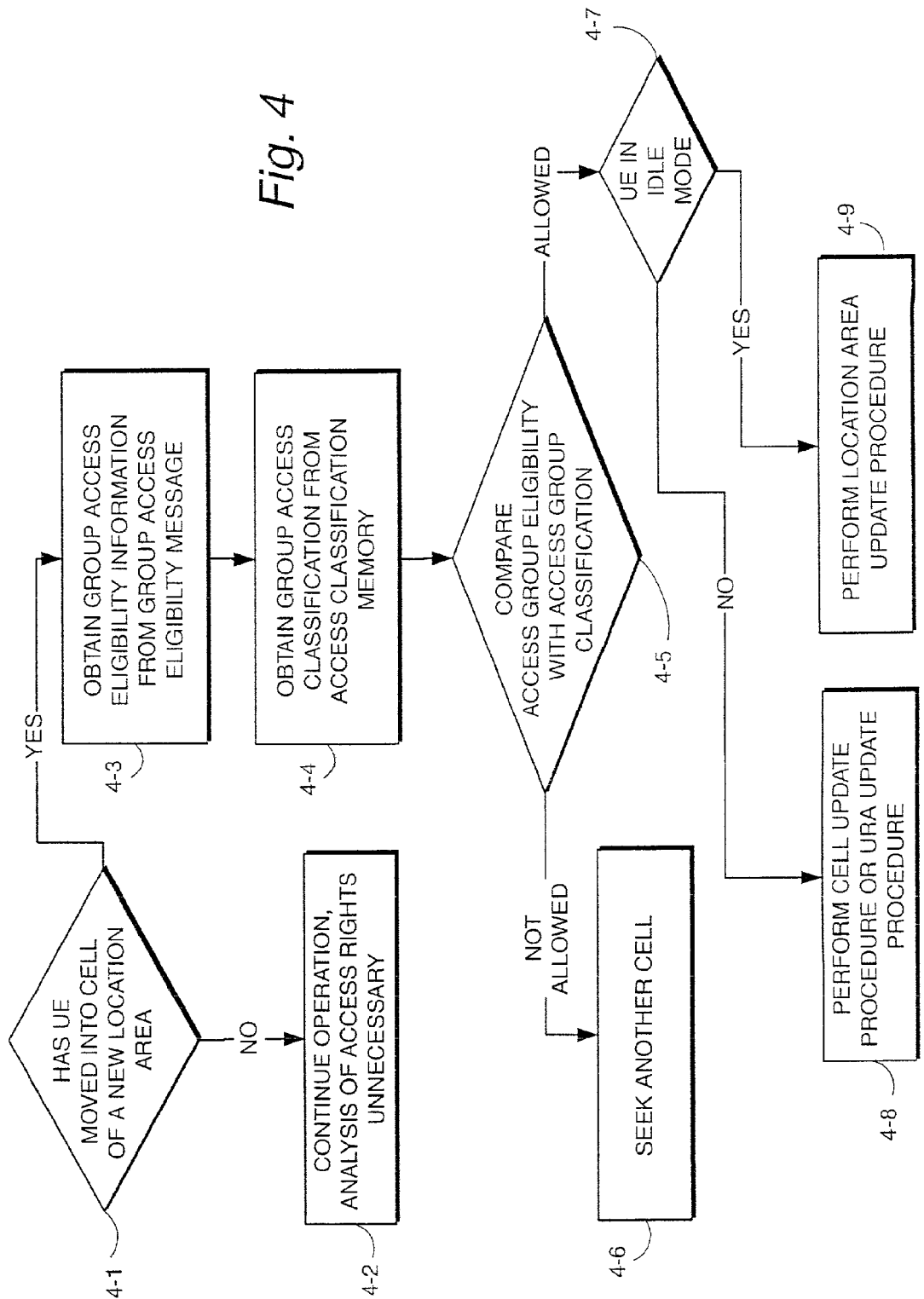

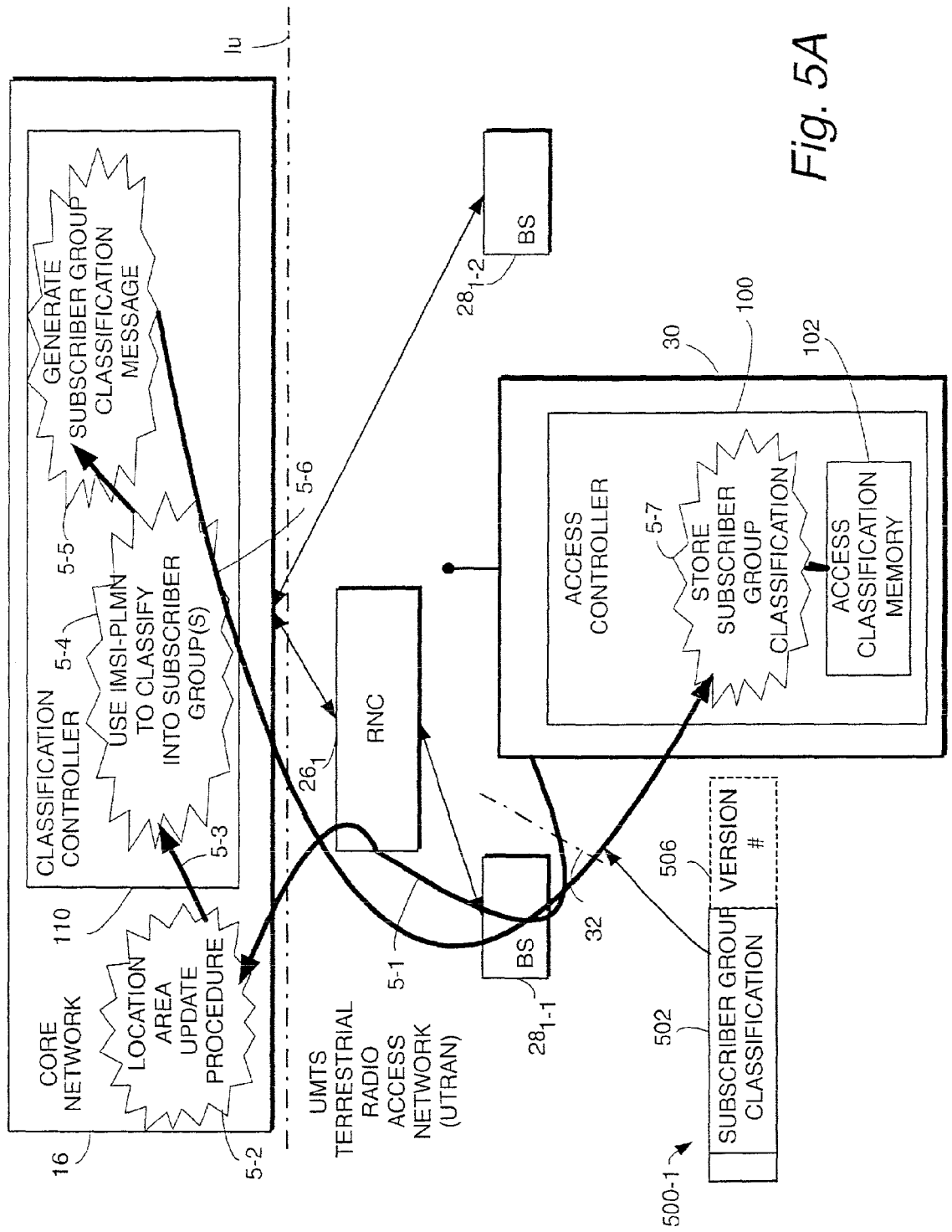

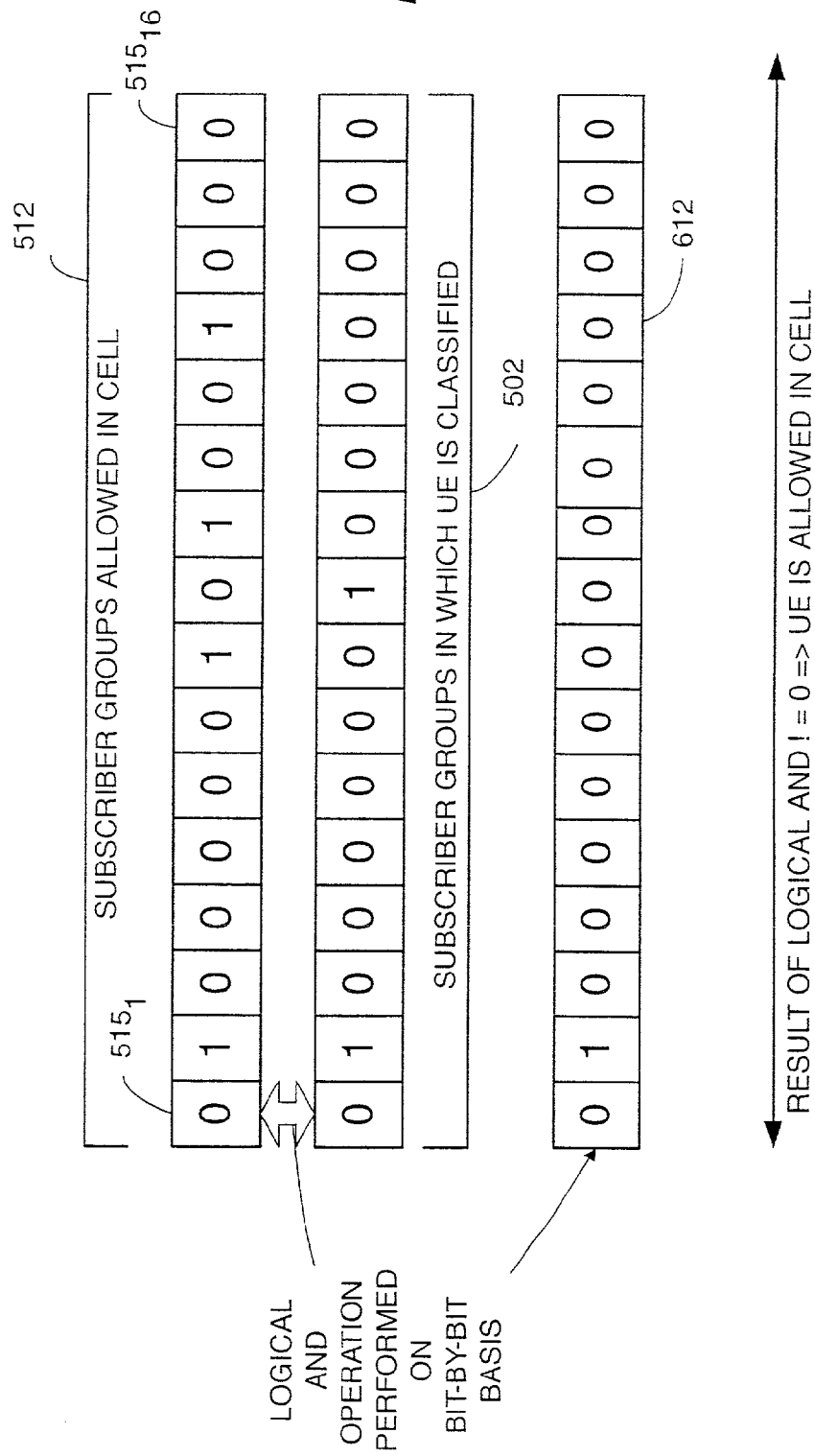

COORDINATED SUBSCRIBER ACCESS HANDLING FOR SHARED NETWORK SUPPORT

This application claims the benefit and priority of the following (all of which are incorporated herein by reference in their entirety): U.S. Provisional Patent Application No. 60/329,503, filed Oct. 17, 2001, entitled "Coordinated Subscriber Access Handling For Shared Network Support"; and, U.S. Provisional Patent Application No. 60/330,708, filed Oct. 29, 2001, entitled "Coordinated Subscriber Access Handling For Shared Network Support". This application is related to the following (all of which are incorporated herein by reference in their entirety): U.S. Provisional Patent Application No. 60/268,065, filed Feb. 13, 2001, entitled "Handover In A Shared Radio Access Network Environment Using Subscriber Dependent Neighbor Cell Lists"; U.S. Provisional Patent Application No. 60/301,442, filed Jun. 29, 2001, entitled "Partial Support of Mobility Between Radio Access Networks"; U.S. patent application Ser. No. 09/932,447, filed Aug. 20, 2001, entitled "Transmission of Filtering/Filtered Information Over the Iur Interface"; U.S. patent application Ser. No. 10/068,012, filed Feb. 13, 2001, entitled "Handover In A Shared Radio Access Network Environment Using Subscriber Dependent Neighbor Cell Lists"; and, U.S. patent application Ser. No. 10/068,000, filed Feb. 13, 2002, entitled "Partial Support of Mobility Between Radio Access Networks".

BACKGROUND

1. Field of the Invention

This invention pertains to telecommunications, and particularly to the structure and operation of shared telecommunication networks.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25, external networks). MSCs and GSNs are in contact with a Home Location Register (HRL), which is a database of subscriber information.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Serving or Source RNC (SRNC) and a target or drift RNC (DRNC), with the SRNC controlling the connection but with one or more diversity legs of the connection being handling by the DRNC. An Inter-RNC transport link can be utilized for the transport of control and data signals between Source RNC and a Drift or Target RNC, and can be either a direct link or a logical link as described, for example, in International Application Number PCT/US94/12419, (International Publication Number WO 95/15665). An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a connection with the user equipment unit (UE). A system which includes the drift radio network controller (DRNC) and the base stations controlled over the Iub Interface by the drift radio network controller (DRNC) is herein referenced as a DRNC subsystem or DRNS. An RNC is said to be the Controlling RNC (CRNC) for the base stations connected to it by an Iub interface. This CRNC role is not UE specific. The CRNC is, among other things, responsible for handling radio resource management for the cells in the base stations connected to it by the Iub interface.

The UTRAN interfaces (Iu, Iur and Iub) have two planes, namely, a control plane (CP) and a user plane (UP). In order to control the UTRAN, the radio network application in the different nodes communicate by using the control plane protocols. The RANAP is a control plane protocol for the In interface; the RNSAP is a control plane protocol for the Iur interface; and NBAP is a control plane protocol for the Iub interface. The control plane protocols are transported over reliable signaling bearers. The transport of data received/transmitted on the radio interface occurs in the user plane (UP). In the user plane, the data is transported over unreliable transport bearers. The serving radio network controller (SRNC) is responsible for establishing the necessary transport bearers between the serving radio network controller (SRNC) and the drift radio network controller (DRNC).

It has recently been contemplated that two or more operators can share network infrastructure, e.g., share a UTRAN in a particular geographical area. In the shared network all of the UTRAN resources are shared, e.g. RNCs, node-Bs, cells, etc, and can be used equally by subscribers of both sharing operators. Using shared networks, operators can reduce the cost of network build-out. But shared networks also engender many scenarios presenting technical challenges, including scenarios where subscribers require different access rights when moving between shared networks and non-shared networks, or moving within shared networks.

Various techniques for handling access rights have been proposed generally, some of which have been suggested for third generation WCDMA networks (some having been set forth in specifications of the Third Generation Partnership Project (3GPP)). Four broad categories of such proposals, briefly discussed below, are: (1) equivalent PLMNs; (2) forbidden access areas; (3) subscriber groups (to support selective handover); and (4) roaming restriction groups (to allow roaming restrictions).

The equivalent PLMN proposal essentially involves a user equipment unit (UE) treating various PLMNs as equivalent for the purposes of handover and cell reselection. Equivalent PLMNs are described, e.g., in 3GPP TS 25.304.

Forbidden location areas are those location areas which are forbidden for a user equipment unit (UE) to access. Forbidden location areas are described, e.g., in 3GPP TS 25.304, and 3GPP TS 24.008.

The subscriber group proposals involves subscriber groups which, along with their compositions, are typically pre-agreed among operators, so that (for example) each operator knows which subscriber can be included in a particular subscriber group. For example, a first subscriber group (SG) could comprise all subscribers of a first operator, and all subscribers that have roaming agreements with that operator. Operators, and thus a subscriber group can be defined or expressed, for example, as one or more IMSI-PLMNs.

As used herein, the term "IMSI-PLMN" means the PLMN which has been extracted from the IMSI of a user equipment unit (it being kept in mind that the IMSI of many user equipment units will have the same IMSI-PLMN). The international mobile subscriber identity (IMSI) is stored in the RNC for each connected mode user equipment unit. The international mobile subscriber identity (IMSI) is received in the RNC from the core network (CN) in a RANAP COMMON ID message when a radio resource control (RRC) connection is setup. The international mobile subscriber identity (IMSI) [which comprises not more than fifteen digits] comprises three components: a mobile country code (MCC)[three digits]; a mobile network code (MNC)[two or three digits]; and a mobile subscriber identification number (MSIN). The home-public land mobile network (HPLMN) id [HPLMNid] of the user equipment unit can be extracted from the international mobile subscriber identity (IMSI). In this regard, the HPLMNid of the user equipment unit is the mobile country code (MCC)+the mobile network code (MNC).

Heretofore subscriber groups have been proposed to support selective handover. Selective handover is a technique which involves filtering out the cells that are not possible/permitted (or not preferred) for handover for a given user equipment unit, and only sending the list of allowed neighbor cells to the user equipment unit, so that the user equipment unit can measure on those cells, and send the results to the RNC. The RNC will then choose a cell to which to handover to based on the measured results. Selective handover is described, e.g., in U.S. patent application Ser. No. 09/932,447,, filed Aug. 20, 2001,, entitled "Transmission of Filtering/Filtered Information Over the Iur Interface", which is incorporated herein by reference in its entirety.

Roaming restriction groups have been employed in GSM, but are not currently passed over any interface, nor are they described in any technical specification.

Various problems arise in implementing these proposals. One such problem is lack of uniformity or alignment of solutions for UEs in the IDLE mode on the one hand, and UEs in the CONNECTED MODE on the other hand. Within Connected Mode there are four different states: CELL_DCH state; CELL_FACH state; CELL_PCH state; and URA_PCH state. As described, e.g., in U.S. Provisional Patent Application No. 60/317,970,, filed Sep. 10, 2001, entitled "RECOVERY OF MOBILE STATION(S) IN CONNECTED MODE UPON RNC FAILURE" (which is incorporated herein by reference in its entirety), each state reflects a different level of activity.

An illustrative example of such misalignment occurs in the context of a proposal involving forbidden location areas. Such proposal requires that an IDLE mode user equipment unit (UE) perform a location update in a given area to find out whether the user equipment unit (UE) is allowed access in that area or not. Performing a location update for an IDLE mode user equipment unit (UE) requires that a radio resource control (RRC) connection be set up in the UTRAN, and signaling performed from the user equipment unit (UE) towards the core network (CN). If the user equipment unit (UE) is not allowed in the area, the user equipment unit (UE)

is so informed by the core network in a location area update reject message. When the location area update reject message is received, the user equipment unit (UE) updates a location area forbidden list which the user equipment unit (UE) maintains, and the RRC connection to the UTRAN is released.

The actions taken when a CONNECTED mode user equipment unit (UE) [in the CELL_FACH state; the CELL_PCH state; and the URA_PCH state] without an updated location area forbidden list enters a forbidden area for that user equipment unit (UE) differ from the above-described actions for an IDLE mode user equipment unit (UE). The CONNECTED mode user equipment unit (UE) must perform either a cell update or a URA update in the forbidden cell, and be rejected in the UTRAN (based on a subscriber group check performed in the UTRAN, or some equivalent check based on the user equipment unit's IMSI-PLMN performed in UTRAN), after which the user equipment unit (UE) goes into IDLE mode. In the IDLE mode the user equipment unit (UE) performs a location area update in the location area towards the core network. Upon receipt of a location area update reject message, the user equipment unit (UE) updates its location area forbidden list and tries to register in a new location area.

Proposals such as the foregoing dealing with access rights in shared networks thus involve considerable signaling for the mere purpose of informing a user equipment unit (UE) that it is not allowed to operate in a particular area. Moreover, various of these proposals can also lead to a CONNECTED mode user equipment unit (UE) having its RRC connection released unnecessarily.

What is needed, therefore, and an object of the present invention, is a technique to determine access rights for a user equipment unit (UE) in a shared network context with minimal signaling overhead.

BRIEF SUMMARY

To facilitate, e.g., determination of access rights in a shared network context, a telecommunications network transmits, in a broadcast channel over an air interface, an access group eligibility message to a user equipment unit. The access group eligibility message enables the user equipment unit to ascertain, on a basis of access group to which the user equipment unit belongs, whether the user equipment unit is eligible to operate in a cell for which the access group eligibility message is transmitted. The access group eligibility message can be generated by a radio access network node.

The telecommunications network also includes a core network node which, upon receipt of request for/from the user equipment unit, classifies the user equipment unit in at least one of plural access groups. Further, the core network node generates, for transmission to the user equipment unit through the radio access network, an access group classification message which advises the user equipment unit as to which of the plural access groups the user equipment unit belongs. Upon receipt of the access group classification message, the user equipment unit stores an access group classification obtained from the access group classification message in a memory at the user equipment unit. In illustrated embodiments, the access group classification message can, as appropriate, be one of a location update response and a location update reject message, either of which can include the access group classification.

In accordance with one aspect of the present invention, the user equipment unit (upon receiving the access group eligibility message) compares the stored access group classification with contents of the access group eligibility message to determine whether the user equipment unit is allowed access to the cell for which the access group eligibility message is transmitted. This determination thus allows the user equipment unit to make a decision whether or not it has access rights in a particular cell, and thereby addresses access rights in complex network configurations such as a shared network situation. Further, the present invention provides an access rights determination scheme generally applicable to a user equipment unit regardless of whether it is in the IDLE mode or in one of the following states of the CONNECTED mode: CELL_FACH state; CELL_PCH state; and URA_PCH state.

Upon entering a new cell which involves a transition to a new location area, the user equipment unit checks the access group eligibility message transmitted for the new cell in order to compare the stored access group classification with contents of the access group eligibility message to determine whether the user equipment unit is allowed access to the new cell. By contrast, upon entering a new cell which does not involve a transition to a new location area, the user equipment unit need not check the access group eligibility message to determine whether the user equipment unit is allowed access to the new cell.

Both the access group classification message and the access group eligibility message can take various forms. For example, in one implementation, the access group can be a subscriber group. In such implementation, the access group classification message becomes a subscriber group classification message which advises into which subscriber group the user equipment unit is classified. Concomitantly, the access group eligibility message becomes a subscriber group eligibility message which indicates what subscriber groups are eligible to operate in the cell for which the subscriber group eligibility message is transmitted. In another example implementation, the access group can be a restriction group. In such implementation, the access group classification message becomes a restriction group classification message which advises into which restriction group(s) the user equipment unit is classified. Concomitantly, the access group eligibility message becomes a restriction group ineligibility message which indicates what restriction groups are not eligible to operate in the cell for which the restriction group eligibility message is transmitted.

In one example format, the access group eligibility message includes a bitmap which indicates eligibility for plural access groups (e.g., which subscriber groups or restriction groups are permitted/refused in the cell). In one example generic implementation of the invention the access group eligibility message includes a first bitmap which indicates eligibility for the plural access groups; while the access group classification message includes a second bitmap which advises the user equipment unit as to which of the plural access groups the user equipment unit belongs. The user equipment unit performs a logical operation with respect to the first bitmap and the second bitmap to determine whether the user equipment unit is allowed access to the cell for which the access group eligibility message is transmitted. In first example specific implementation the first bitmap indicates which of plural subscriber groups are eligible and the second bitmap indicates to which one(s) of plural subscriber groups the user equipment unit belongs. In a second example specific implementation the first bitmap indicates which of plural restriction groups are ineligible and the second bitmap indicates to which one(s) of plural restriction groups the user equipment unit belongs. In both example specific implementations, the user equipment unit performs a logical AND operation between corresponding bit positions of the first bitmap and the second bitmap.

In one of its aspects, the present invention also accommodates changes of access group classification by a core network. To this end, the access group classification message includes the access group classification and (optionally) a version field associated with the access group classification. If the core network changes the access group classification, in a subsequent core network message the core network can advise the user equipment unit regarding a revised access group classification and a version field associated with the access group classification carried by the subsequent core network message. By comparing the contents of the version field associated with the access group classification and the version field associated with the access group classification carried by the subsequent core network message, the user equipment unit can determine whether the user equipment unit should update its stored access group classification.

In another of its aspects, the present invention accommodates movement of a user equipment unit into a cell of another core network which has a different access group classification than the core node (the "previous core network") which provided the user equipment unit with the user equipment unit's currently stored access group classification. Here again the access group classification message includes both the access group classification and (optionally) a version field associated with the access group classification. Upon entering a new cell associated with a second core network, the user equipment unit receives an access group eligibility message transmitted for the new cell. The access group eligibility message transmitted for the new cell includes a version field associated with the contents of the access group eligibility message transmitted for the new cell. The user equipment unit determines, by comparing contents of the version field associated with the access group classification and the version field associated with the access group eligibility message transmitted for the new cell, whether the user equipment unit should update its stored access group classification for consistency with the second core network.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4 is a flowchart showing certain basic example steps performed by an access controller of a user equipment unit in analyzing access rights in accordance with one example mode of the present invention.

FIG. 5A is a diagrammatic view showing certain basic example actions performed in connection with generation of a subscriber access group classification message in accordance with an example embodiment of the invention.

FIG. 7A is a diagrammatic view of fields of a subscriber group classification message and a subscriber group eligibility message are formatted as bitmaps.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
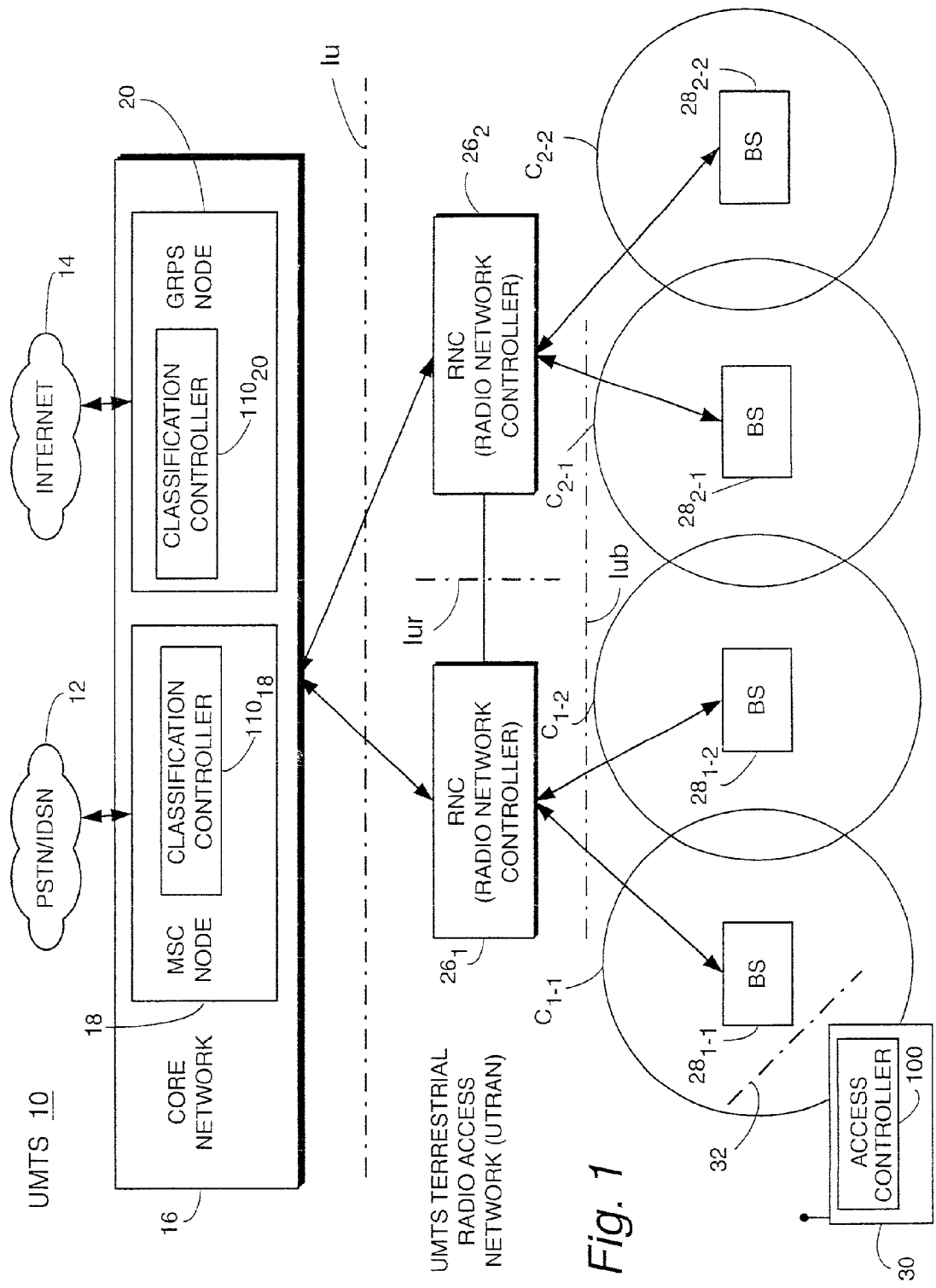
FIG. 1 is diagrammatic view of example mobile communications system in which the present invention may be advantageously employed.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to one or more radio access networks (RANs) over an interface referred to as the Iu interface. In the illustrated example, the radio access network (RAN) is more specifically known as a UMTS Terrestrial Radio Access Network (UTRAN) 24. The UTRAN 24 includes one or more radio network controllers (RNCs) 26, only two such RNCs $26_1$, and $26_2$, being shown by way of example in FIG. 1. Each radio network controller (RNC) 26 is connected to and controls one or more base stations (BS) 28. For example, and again for sake of simplicity, two base station nodes are shown connected to each radio network controller 26. In this regard, RNC $26_1$, serves base station $28_{1-1}$, and base station $28_{1-2}$, while RNC $26_2$, serves base station $28_{2-1}$, and base station $28_{2-2}$, and RNC $26_3$, serves base station $28_{3-1}$, and base station $28_{3-2}$. Those skilled in the art will also appreciate that a base station is sometimes also referred to in the art as a radio base station, a node B, or B-node. It will also be appreciated that a different number of base stations can be served by each radio network controller, and that radio network controllers need not serve the same number of base stations. Moreover, although not necessarily illustrated in FIG. 1, a radio network controller can be connected over an Iur interface to one or more other RNCs In the course of describing the present invention, it should be understood that the radio network controllers (RNC) $26_1$, and $26_2$, may be operated as a shared network (e.g., these radio network controllers and the base stations controlled are shared by one or more operators [e.g., telephone service provider companies]). Alternatively, some of the network controllers (RNC) 26 may be shared, while others are not. As a further alternative, all of the radio network controllers (RNC) $26_1$, and $26_2$, may be operated as an unshared network (e.g., only one operator owns both nodes). As such, the present invention applies to all kinds of handovers including the following: (1) handing over from a shared network node to the sharing operator's own RNC (e.g., handing over from a shared serving radio network controller (SRNC) to one of the operator's own drift radio network controllers (DRNC)); (2) handing over from the operator's own serving radio network controller (SRNC) node to a shared drift radio network controller (DRNC); (3) handing over from a shared serving radio network controller (SRNC) to a shared drift radio network controller (DRNC) (e.g., different operators sharing both RNCs); (4) handing over from an operator's own serving radio network controller (SRNC) to the operator's own drift radio network controller (DRNC).

In the illustrated embodiments, for sake of simplicity each base station 28 is shown as serving one cell C. The cells C shown in FIG. 1 are provided with the same subscript as their corresponding base stations (BS) 28. Each cell is represented by a circle which surrounds the respective base station. It will be appreciated by those skilled in the art, however, that a base station may serve for communicating across the air interface for more than one cell. For example, two cells may utilize resources situated at the same base station site.

A user equipment unit (UE), such as user equipment unit (UE) 30 shown in FIG. 1, communicates with one or more cells or one or more base stations (BS) 28 over a radio or air interface 32. Each of the radio interface 32, the Iu interface, the Iub interface, and the Iur interface are shown by dash-dotted lines in FIG. 1. For the particular user equipment unit (UE) 30 shown in FIG. 1, radio network controller (RNC) $26_1$, currently fulfills the role of the serving radio network controller (SRNC). Preferably, radio access is based upon Wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality.

Figure 2:
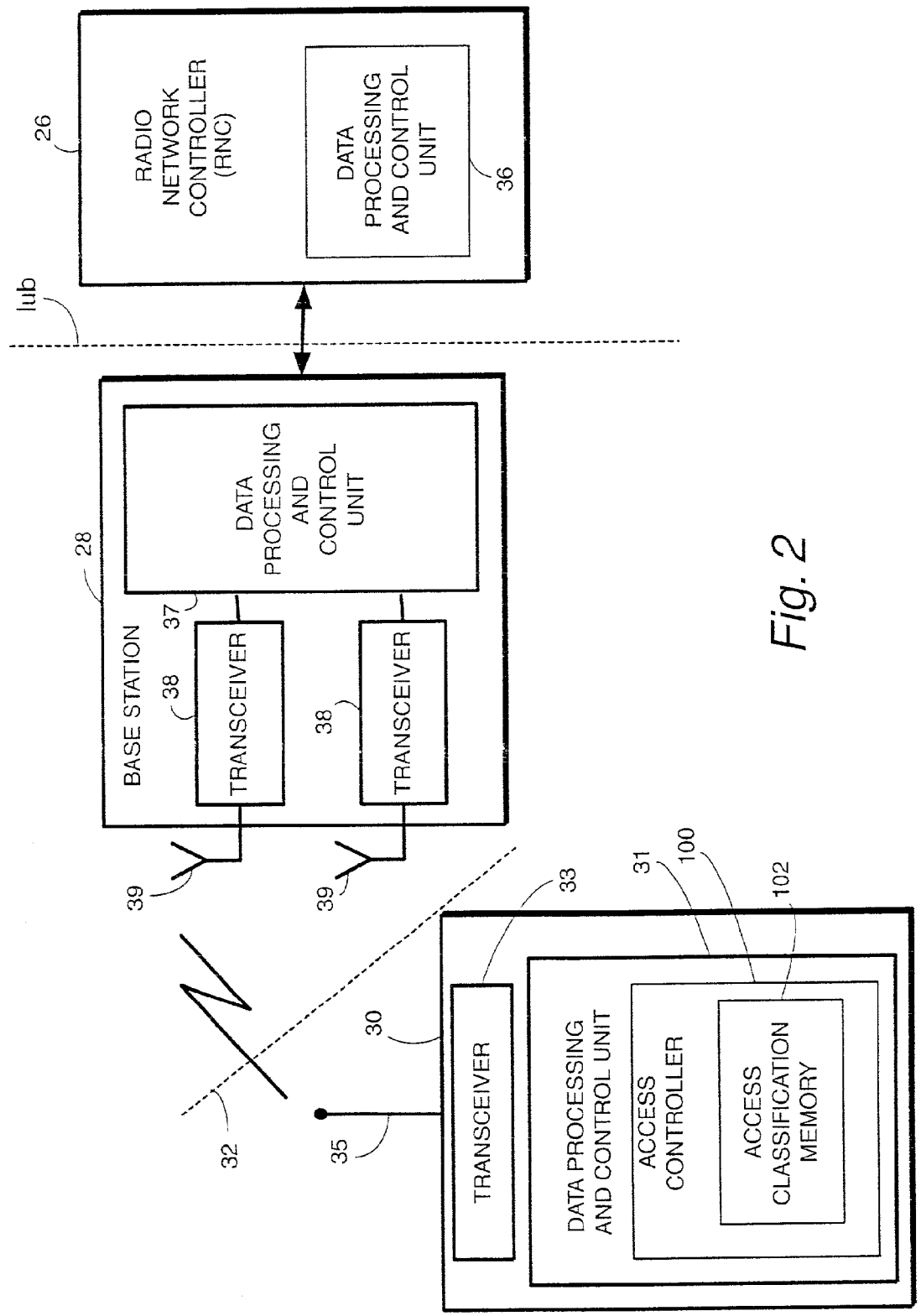
FIG. 2 is a simplified function block diagram of a portion of a UMTS Terrestrial Radio Access Network, including a user equipment unit (UE) station; a radio network controller; and a base station.

FIG. 2 shows selected general aspects of user equipment unit (UE) 30 and illustrative nodes such as radio network controller 26 and base station 28. The user equipment unit (UE) 30 shown in FIG. 2 includes a data processing and control unit 31 for controlling various operations required by the user equipment unit (UE). The UE's data processing and control unit 31 provides control signals as well as data to a radio transceiver 33 connected to an antenna 35.

The example radio network controller 26 and base station 28 as shown in FIG. 2 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

One aspect of the present invention is that the user equipment unit (UE) 30 includes an access controller 100 which, with the aid of various messages herein described, makes a determination whether the user equipment unit (UE) 30 is eligible to operate in a certain cell. The determination of eligibility is necessary in a shared network context, as the user equipment unit (UE) 30 may or may not have rights in the cell, depending upon the configuration of the shared network. In the example implementation shown in FIG. 1 and FIG. 2, the access controller 100 is included in the data processing and control unit 31 of user equipment unit (UE) 30, although it may be elsewhere situated in user equipment unit (UE) 30. Further, the access controller 100 includes, or at least works in conjunction with, an access classification memory 102 (see FIG. 2).

As another aspect of the present invention, a core network includes a classification controller 110 which classifies a user equipment unit in at least one of plural access groups, and generates (for transmission to the user equipment unit through the radio access network) an access group classification message which advises the user equipment unit as to which one(s) of the plural access groups the user equipment unit belongs. In an example implementation of the present invention, the classification controller 110 is situated in a node of the core network. In this regard, and by way of example, FIG. 1 shows a classification controller $110_{18}$, being situated in the Mobile Switching Center (MSC) node 18 which pertains to circuit-switched services and a classification controller $110_{20}$, situated in the General Packet Radio Service (GPRS) node 20 which provides packet-switched type services. For purposes of general (e.g., without node specificity) the classification controller is generally referenced herein as classification controller 110. Similarly, reference to the core network (e.g., core network 16) can encompass any core network node such as nodes 18 and 20 previously described.

Figure 3A:
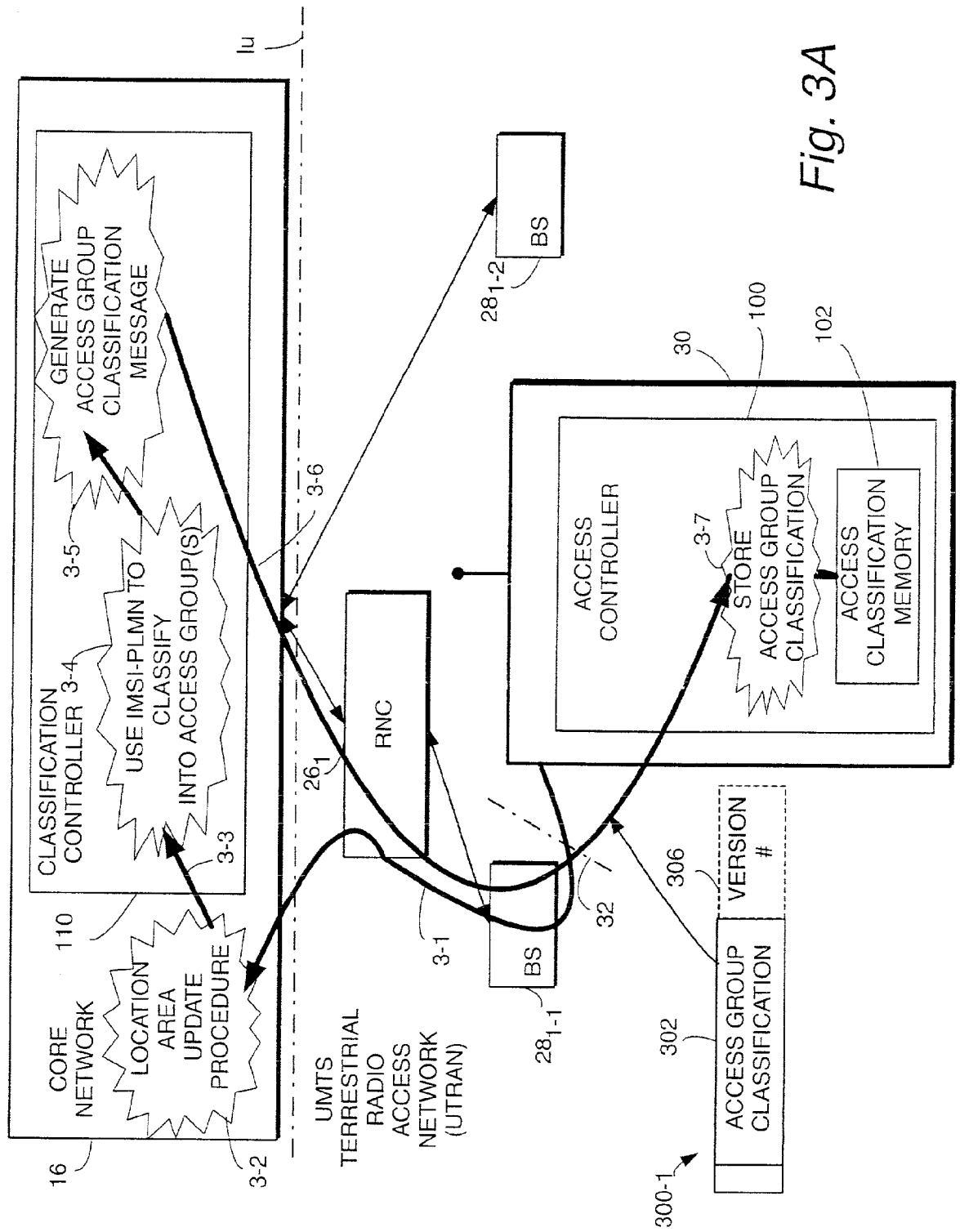
FIG. 3A is a diagrammatic view showing certain basic example actions performed in connection with generation of a generic access group classification message in accordance with an example embodiment of the invention.

Basic example steps or actions involved, e.g., in generation of the access group classification message are depicted in FIG. 3A. In the illustrated embodiment, the access group classification message is generated in response to a request message issued from or on behalf of user equipment unit (UE) 30 toward the core network 16. Such request message is depicted generically as message 3-1 in FIG. 3A, which finds the user equipment unit (UE) 30 in cell $C_{1-1}$, served by radio base station $28_{1-1}$. In one particular implementation of the illustrated embodiment, the request message of action 3-1 is a location area update request towards the core network. Location area update requests and location area update procedures generally are described in 3GPP TS 24.008. In performing its location area (LA) update procedure (represented by action 3-2 in FIG. 3A), the core network determines that an access group classification message should be generated, and accordingly (as action 3-3) commissions or instructs classification controller 110 to prepare the access group classification message. It should be understood that the classification controller 110 may be a separate controller or server per se, or may be a set of instructions or logic which is executed by the same or related hardware that performs the location update procedure.

As action 3-4, the classification controller 110 classifies the user equipment unit (UE) 30 in at least one of plural access groups. Such classification involves an analysis of the IMSI-PLMN of the user equipment unit (UE) 30. As explained previously, the term "IMSI-PLMN" means the PLMN which has been extracted from the IMSI of a user equipment unit. Upon analzying the IMSI-PLMN, the classification controller 110 determines which access groups are defined or configured to include or encompass the IMSI-PLMN of the user equipment unit (UE) 30. The IMSI-PLMN of the user equipment unit (UE) 30 may qualify the user equipment unit (UE) 30 for membership or privileges with respect to one or more access groups. Examples of access groups, hereinafter described, are subscriber groups and restriction groups.

Upon determining (at action 3-4) the access groups for which the user equipment unit (UE) 30 has membership or privileges, as action 3-5 the classification controller 110 prepares the access group classification message 300 (see FIG. 3A). The access group classification message 300 includes, e.g., an access group classification field 302. The access group classification field 302 is a list or other indicia or definition of the access groups to which the user equipment unit (UE) 30 belongs or otherwise has access privileges. FIG. 3A shows as action 3-6 the transmission of the access group classification message 300 to user equipment unit (UE) 30. The access group classification message 300 is transmitted to the user equipment unit (UE) 30 from the base station 28 over the air interface 32. In the implementation in which the request message of action 3-1 is a location area update request message, the access group classification message 300 transmitted as action 3-6 can be in the form of a location area update accept message or a location area update reject message, whichever is appropriate. Upon receipt of the access group classification message 300, as action 3-7 shown in FIG. 3A the access controller 100 of user equipment unit 30 stores the access group classification (obtained, e.g., from access group classification field 302) in access classification memory 102.

Figure 3B:
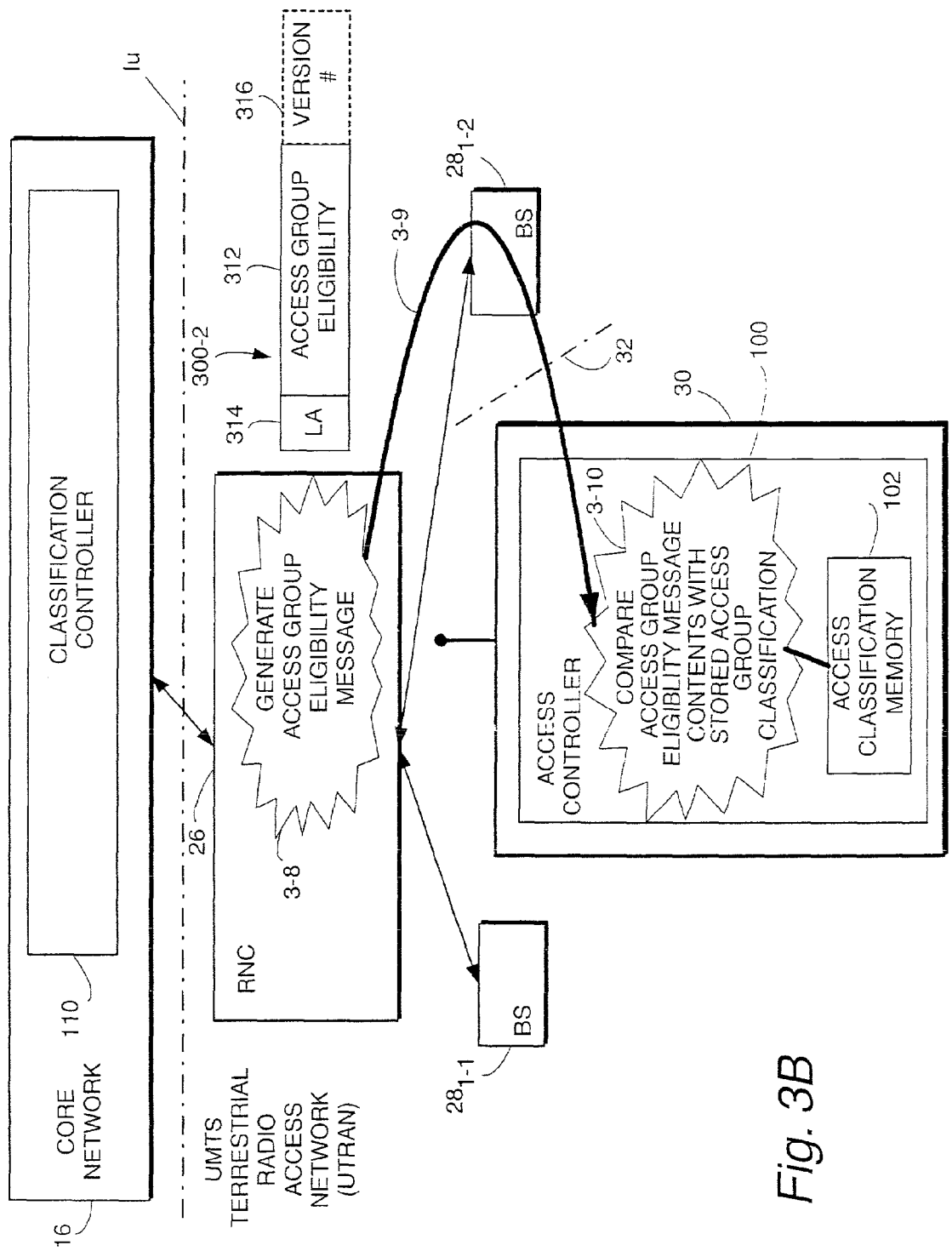
FIG. 3B is a diagrammatic view showing certain basic example actions performed in connection with generation of a generic access group eligibility message in accordance with an example embodiment of the invention.

FIG. 3B shows basic example steps or actions performed in conjunction with generation of the access group eligibility message which is an aspect of the present invention. At the particular time shown in FIG. 3B (which can be subsequent to the time of FIG. 3A), the user equipment unit (UE) 30 has entered a new cell (e.g., cell $C_{1-2}$, served by radio base station $28_{1-2}$). The user equipment unit (UE) 30 is in the IDLE mode or in one of the following states of the CONNECTED mode: CELL_FACH state; CELL_PCH state; and URA_PCH state. The new cell is controlled by a radio network controller (RNC), e.g., radio network controller $26_1$, which (as action 3-8) has prepared an access group eligibility message for transmission or broadcast in the cell served by radio base station $28_{1-2}$.

Action 3-9 of FIG. 3B represents transmission of the access group eligibility message 300-2. In one example implementation, the access group eligibility message is actually broadcast in a broadcast channel. Without regard to particular channel, FIG. 3B shows transmission of the access group eligibility message to user equipment unit (UE) 30 as including a radio frequency transmission between radio base station $28_{1-2}$, and the user equipment unit (UE) 30. As also shown in FIG. 3B, the access group eligibility message 300-2 includes a field 312 which comprises a list or other indication of which access groups can (or, conversely, cannot) operate in a cell for which the access group eligibility message is transmitted.

The location area (LA) in which the cell (e.g., cell $C_{1-2}$, in the current example) is included is transmitted or broadcast to the user equipment units served by the cell. As one aspect of the present invention, a location area (LA) identifier(s) for the location area(s) to which the cell belongs is included in the access group eligibility message. In this regard, FIG. 3B shows a location area (LA) identifier field 314 which is included in the access group eligibility message. It should be understood, however, that the present invention is not limited by transmission of both location area (LA) identifier field 314 and access group eligibility field 312 in the same message, or (for that matter) the particular format of the access group eligibility message or any other message (e.g., access group classification message) described herein.

Various example steps performed by access controller 100 of user equipment unit (UE) 30 upon receipt of the access group eligibility message are illustrated in FIG. 4. As step 4-1, the access controller 100 of user equipment unit (UE) 30 determines whether the user equipment unit (UE) 30 has moved into a cell which belongs to a new location area (e.g., a new location area relative to the location area of the cell from whence the user equipment unit (UE) 30 just came). If the new cell does not involve a new location area, the user equipment unit essentially continues its operation without need to re-examine the issue of access rights (as depicted by symbol 4-2 in FIG. 4). On the other hand, if the cell is part of a new location area, the remaining steps of FIG. 4 are performed.

In performing its analysis of access rights, as step 4-3 the access controller 100 obtains the contents of the access group eligibility field 312 from the access group eligibility message. Also, as step 4-4 (which can occur prior, after, or essentially simultaneously with step 4-3), the access controller 100 obtains the access group classification information as currently stored in access classification memory 102.

At this point, the access controller 100 of user equipment unit (UE) 30 is in a position to make its own determination whether user equipment unit (UE) 30 has access rights with respect to the new cell (with its new location area) into which user equipment unit (UE) 30 has ventured. Such determination is represented both by step 4-5 in FIG. 4 and action 3-10 in FIG. 3B, and involves the access controller 100 comparing the contents of the access group eligibility message (e.g., the contents of access group eligibility field 312) with the access group classification for the user equipment unit (UE) 30 as currently stored in access classification memory 102.

If, in the course of the determination of step 4-5 (e.g., action 3-10) the access group eligibility field 312 indicates that the access group to which the user equipment unit (UE) 30 belongs or is affiliated is not entitled to use of the cell, then user equipment unit (UE) 30 must look for another cell in which to operate, as depicted by step 4-6 in FIG. 4.

On the other hand, should it be determined at step 4-5 (e.g., action 3-10) that the user equipment unit is permitted in the new location area, the remaining steps of FIG. 4 are performed. If the user equipment unit is in its IDLE mode (determined at step 4-7), as step 4-8 the user equipment unit performs a location area (LA) update procedure. However, if the user equipment unit is in either the CELL_FACH state; the CELL_PCH state; or the URA_PCH state of its CONNECTED mode, then (as step 4-9) the user equipment unit performs either a cell update or a URA update procedure. Cell update requests and cell update procedures, as well as URA update requests and URA update procedures, are generally described in 3GPP TS 25.331, RRC Protocol Specifications.

Thus, as illustrated by way of example in FIG. 3B and FIG. 4, upon entering a new cell which involves a transition to a new location area, the user equipment unit checks the access group eligibility message transmitted for the new cell in order to compare the stored access group classification with contents of the access group eligibility message to determine whether the user equipment unit is allowed access to the new cell. By contrast, upon entering a new cell which does not involve a transition to a new location area, the user equipment unit need not check the access group eligibility message to determine whether the user equipment unit is allowed access to the new cell.

If there is no access eligibility message being broadcasted in a cell, then the user equipment unit is able to access the cell just as if an eligibility message permitting access had been broadcasted.

Both the access group classification message and the access group eligibility message can take various forms. For example, in one example implementation illustrated in FIG. 5A and FIG. 5B, the access group can be a subscriber group. In such implementation, the access group classification message becomes a subscriber group classification message 500-1 which advises (in field 502) into which subscriber group the user equipment unit (UE) 30 is classified. Concomitantly, the access group eligibility message becomes a subscriber group eligibility message 500-2 which indicates (in field 512) what subscriber groups are eligible to operate in the cell for which the subscriber group eligibility message is transmitted. Suffixed actions in FIG. 5A and FIG. 5B which are like those of FIG. 3A and FIG. 3B depict similar steps understood in light of the foregoing elucidation of the access group being a subscriber group.

As indicated previously, the subscriber groups and their compositions can be pre-agreed among operators, so that (for example) each operator knows which subscriber can be included in a particular subscriber group. For example, a first subscriber group (SG) could comprise all subscribers of a first operator, and all subscribers that have roaming agreements with that operator. Operators, and thus a subscriber group can be defined or expressed, for example, as one or more IMSI-PLMNs. For example, a first subscriber group (subscriber group 1 [SG1]) may comprise IMSI-PLMN X, IMSI-PLMN Y, and IMSI-PLMN Z; a second subscriber group (subscriber group 2 [SG2]) may comprise IMSI-PLMN B; a third subscriber group (subscriber group 3 [SG3]) may comprise IMSI-PLMN A and IMSI-PLMN D; and so forth.

In a shared network context, this subscriber group grouping can reflect different operators, and their roaming agreements. For example, with reference to subscriber group 1 [SG1], the specific IMSI-PLMNs above mentioned may belong to the Vodafone Network. For the second subscriber group 2 [SG2], the specific IMSI-PLMNs above mentioned may belong to an operator(s) that has a roaming agreement with the Vodafone Network. For the third subscriber group 3 [SG3], the specific IMSI-PLMNs above mentioned may belong to the Orange Network.

Figure 6A:
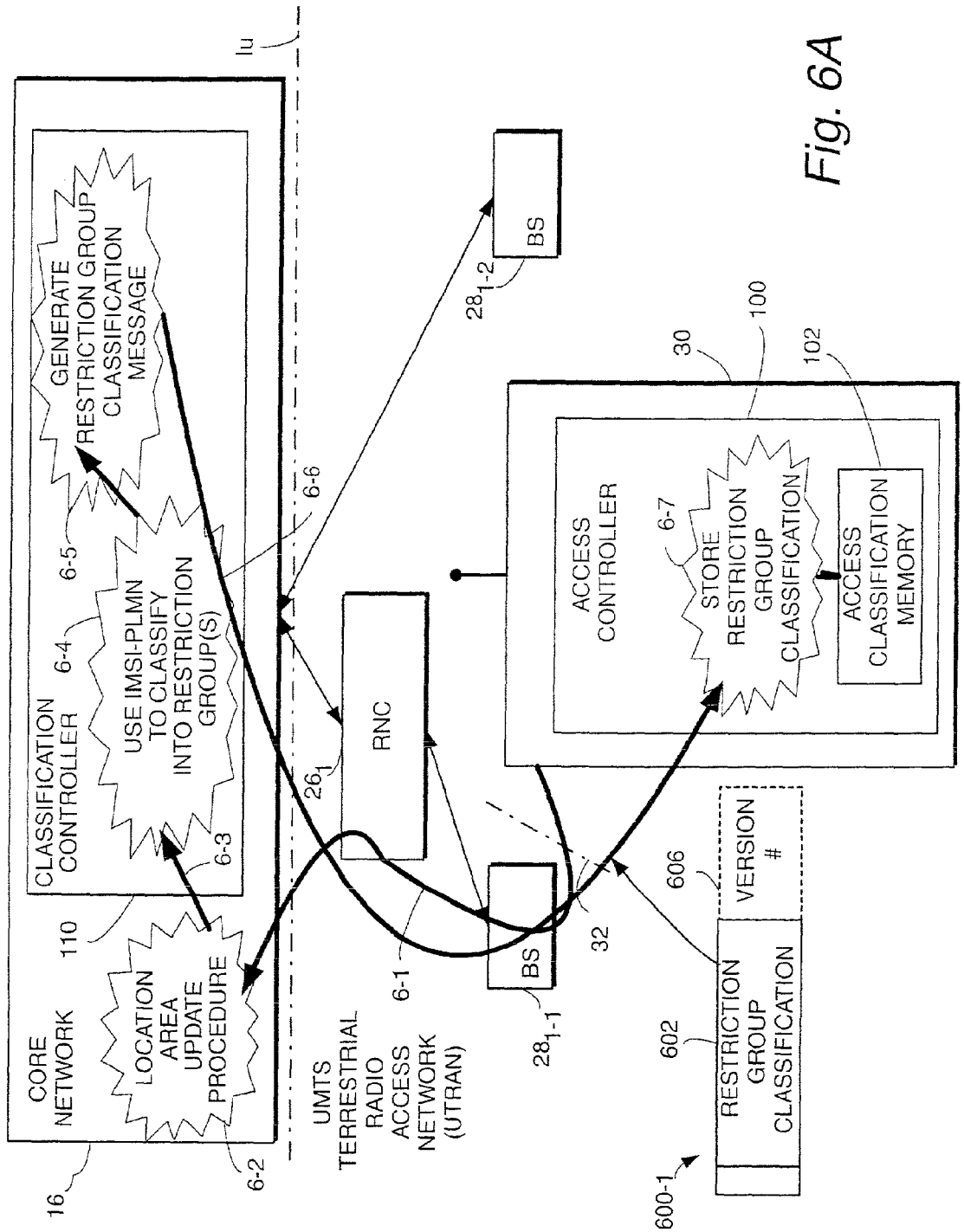
FIG. 6A is a diagrammatic view showing certain basic example actions performed in connection with generation of a restriction access group classification message in accordance with an example embodiment of the invention.
Figure 6B:
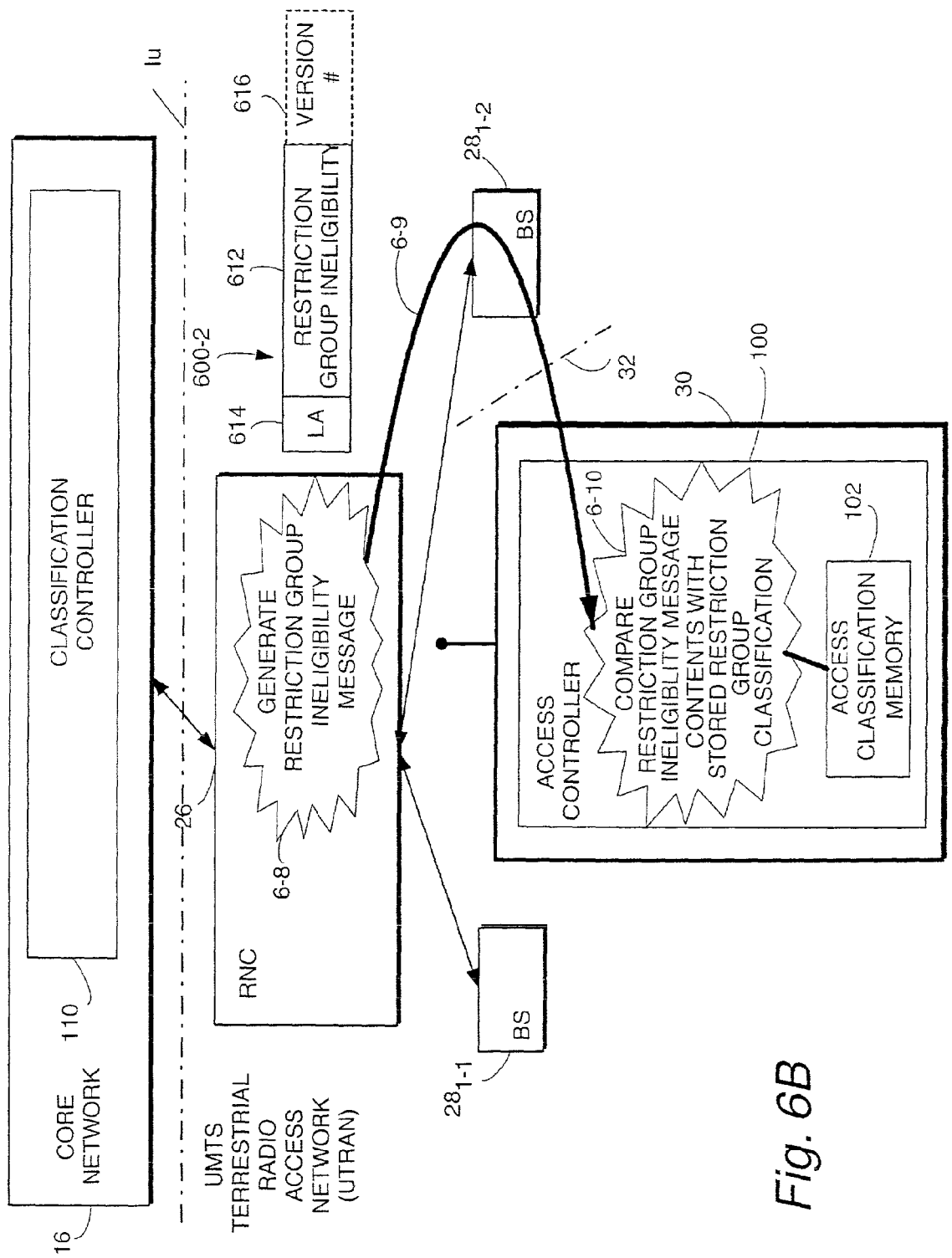
FIG. 6B is a diagrammatic view showing certain basic example actions performed in connection with generation of a restriction access group eligibility message in accordance with an example embodiment of the invention.

In another example implementation illustrated in FIG. 6A and FIG. 6B, the access group can be a restriction group. In such implementation, the access group classification message becomes a restriction group classification message 600 which advises (in field 602) into which restriction group(s) the user equipment unit (UE) 30 is classified. Concomitantly, the access group eligibility message becomes a restriction group ineligibility message 600-2 which indicates (in field 612) what restriction groups are not eligible to operate in the cell for which the restriction group ineligibility message is transmitted. So, if a certain user equipment unit (UE) is a member of one particular restriction group, and that restriction group is designated as restricted in the restriction group ineligibility message 600-2, the user equipment unit (UE) is not allowed access. However, if at the same time that certain user equipment unit (UE) is also a member of another restriction group which is not prohibited by the restriction group ineligibility message 600-2, the user equipment unit (UE) is allowed access in the cell.

Thus, to have access to a cell, for subscription groups you must be a member of at least one subscription group that is allowed access to that cell. For restriction groups, on the other hand, the user equipment unit (UE) must be a member of at least one restriction group that is not restricted from the cell.

For restriction groups, suffixed actions in FIG. 6A and FIG. 6B which are like those of FIG. 3A and FIG. 3B depict similar steps understood in light of the foregoing elucidation of the access group being a restriction group.

The messages described herein, and the fields of those messages, can have various formats. In some example implementation, the access/subscriber/restriction group classification fields of the respective classification messages issued by the core network, and the access/subscriber/restriction group eligibility fields of the respective messages issued by the radio access network, are bitmapped fields.

Figure 5B:
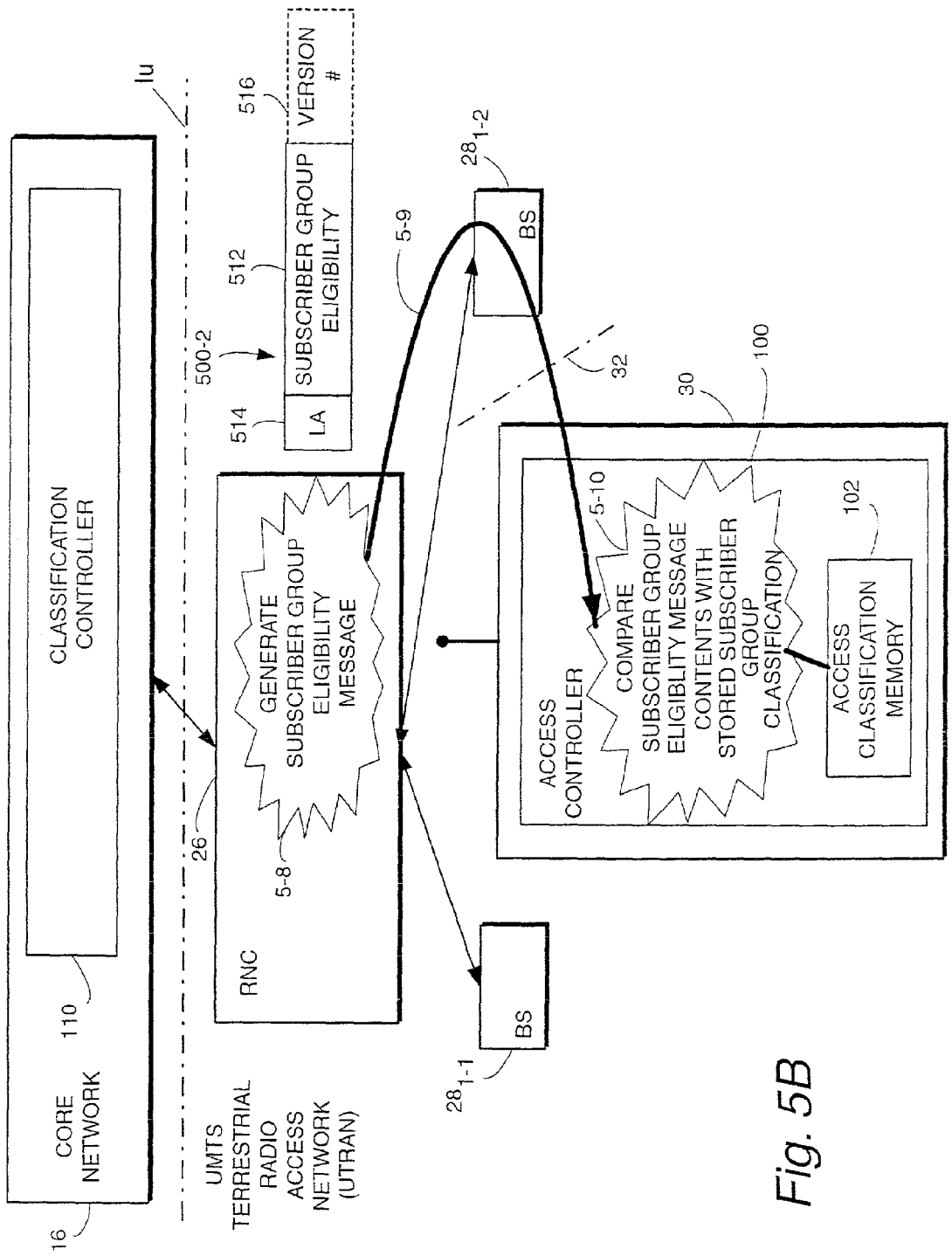
FIG. 5B is a diagrammatic view showing certain basic example actions performed in connection with generation of a subscriber access group eligibility message in accordance with an example embodiment of the invention.

As an example of the foregoing, FIG. 7A illustrates as a top or first bitmap which comprises the subscriber group eligibility field 512 of the subscriber group eligibility message 500-2 of FIG. 5B, which is a specific example of the more generic access group eligibility message 300-2 of FIG. 3B. The bitmap of subscriber group eligibility field 512 has sixteen bit positions $515_1$-$515_{16}$, corresponding to each of sixteen different subscriber groups. In addition, FIG. 7A illustrates as a second bitmap contents of a subscriber group classification field 502 of the subscriber group classification message 500-1 of FIG. 5A, which is a specific example of the more generic access group eligibility message 300-1 of FIG. 3A. The bitmap of the subscriber group classification field 502 also has sixteen bit positions, corresponding to the sixteen bit positions $515_1$-$515_{16}$, of the subscriber group eligibility field 512 and accordingly aligned therewith in FIG. 7A. In this embodiment, the bitmap of the subscriber group classification field 502 is essentially stored in the access classification memory 102 for use in the manner described below.

As action 5-10 of FIG. 5A (which is a specific case of the generic action 3-10 of FIG. 3A) and step 4-6 of FIG. 4, the access controller 100 of user equipment unit (UE) 30 performs a logical AND operation between the respective bit positions of the bitmap of subscriber group eligibility field 512 (which indicates the subscriber groups allowed in the cell) and the bitmap of the subscriber group classification field 502 (which indicates the subscriber group(s) to which the user equipment unit (UE) 30 belongs or is affiliated). The result of the logical AND operation on a bit position basis is shown in the last line of FIG. 7A.

If the result of the logical AND operation equals zero, the user equipment unit (UE) 30 is not allowed in that cell (in which case the user equipment unit (UE) 30 must look for another cell [see step 4-7]). On the other hand, if the result of the logical AND operation is one (e.g., not zero) for at least one bit position, the user equipment unit (UE) 30 is allowed in the cell. In other words, if the result of a logical OR of all the bits of the last line of FIG. 7A equals 1,, then the user equipment unit (UE) is allowed access. If the result of a logical OR of all the bits of the last line of FIG. 7A equals 0,, then the user equipment unit (UE) is not allowed access. In view of the fact that the second bit position of the last line of FIG. 7A is one, it can be concluded that the particular user equipment unit (UE) is allowed in the cell.

Figure 7B:
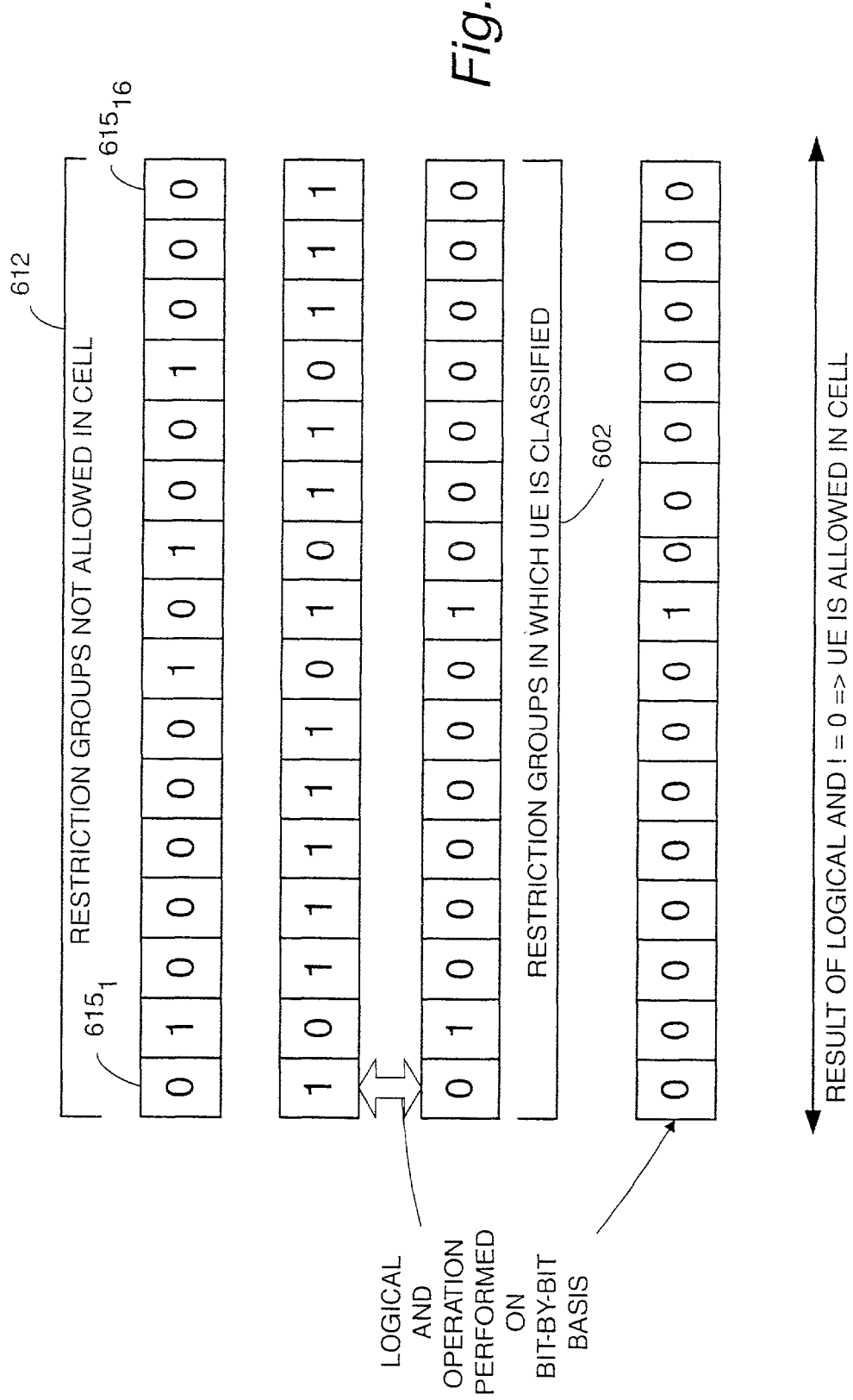
FIG. 7B is a diagrammatic view of fields of a restriction group classification message and a restriction group ineligibility message are formatted as bitmaps, and showing a first technique of access determination.

As another example of the foregoing, FIG. 7B illustrates as a top or first bitmap which comprises the restriction group ineligibility field 612 of the restriction group ineligibility message 600-2 of FIG. 6B, which is a specific example of the more generic access group eligibility message 300-2 of FIG. 3B. As in the previous example, the bitmap of restriction group ineligibility field 612 has sixteen bit positions $615_1$-$615_{16}$, corresponding to each of sixteen different restriction groups. In view of the fact that restriction groups are at issue, an inverse of the bitmap of the first line of FIG. 7B is performed and appears as the second line of FIG. 7B. FIG. 7B illustrates as its third line a bitmap reflecting contents of a restriction group classification field 602 of the restriction group classification message 600-1 of FIG. 6A, which is a specific example of the more generic access group eligibility message 300-1 of FIG. 3A. The bitmap of the restriction group classification field 602 also has sixteen bit positions, corresponding to the sixteen bit positions $615_1$-$615_{16}$, of the restriction group ineligibility field 512 and accordingly aligned therewith in FIG. 7B. In this embodiment, the bitmap of the restriction group classification field 602 is essentially stored in the access classification memory 102 for use in the manner described below. In the particular situation shown in FIG. 7B, the user equipment unit (UE) is a member of restriction groups corresponding to the second and ninth bits of the bitmap of the restriction group classification field 602.

As action 6-10 of FIG. 6A (which is a specific case of the generic action 3-10 of FIG. 3A) and step 4-6 of FIG. 4, the access controller 100 of user equipment unit (UE) 30 performs a logical AND operation between the respective bit positions of the inverse of the bitmap of restriction group ineligibility field 612 (the second line of FIG. 7B) and the bitmap of the restriction group classification field 602 ( the third line of FIG. 7B, which indicates the restriction group(s) to which the user equipment unit (UE) 30 belongs or is affiliated). The result of the logical AND operation on a bit position basis is shown in the last line of FIG. 7B. If the result of the logical AND is one for any restriction group to which the user equipment unit (UE) belongs, the user equipment unit (UE) is permitted in the cell. Thus, with reference to FIG. 7B, the user equipment unit (UE) would not be permitted in the cell by virtue of membership in the restriction group corresponding to the second bit of the bitmap of the restriction group classification field 602, since the result of the logical AND for that bit is zero. On the other hand, the user equipment unit (UE) is permitted in the cell on the basis of its membership in the restriction group corresponding to the ninth bit position of the bitmap of the restriction group classification field 602, since the result of the logical AND for that bit is one.

If the result of the logical AND operation does not equal one for any bit position, the user equipment unit (UE) 30 is not allowed in that cell (in which case the user equipment unit (UE) 30 must look for another cell [see step 4-7]). On the other hand, if the result of the logical AND operation for any bit position is equal to one, the user equipment unit (UE) 30 is allowed in the cell.

A preparatory, precautionary step can be added to the approach of FIG. 7B to preclude an inappropriate determination in the event that no restriction groups are disallowed in the cell and/or the user equipment unit (UE) is not a member of any restriction group. In such case, the first line of FIG. 7B would be all zeros (e.g., no restriction groups are not allowed). The precaution includes performing a logical OR operation with the bit positions of the restriction group ineligibility field 612 prior to taking its inverse. If the result of the logical OR operation is zero, then the user equipment unit (UE) is allowed access to the cell regardless. Additionally or alternatively, a precautionary step can be taken by referencing the restriction group classification field 602 to ascertain whether the user equipment unit (UE) is not a member of any restriction group. If the equipment unit (UE) is not a member of any restriction group, then the user equipment unit (UE) should be allowed in the cell.

Figure 7C:
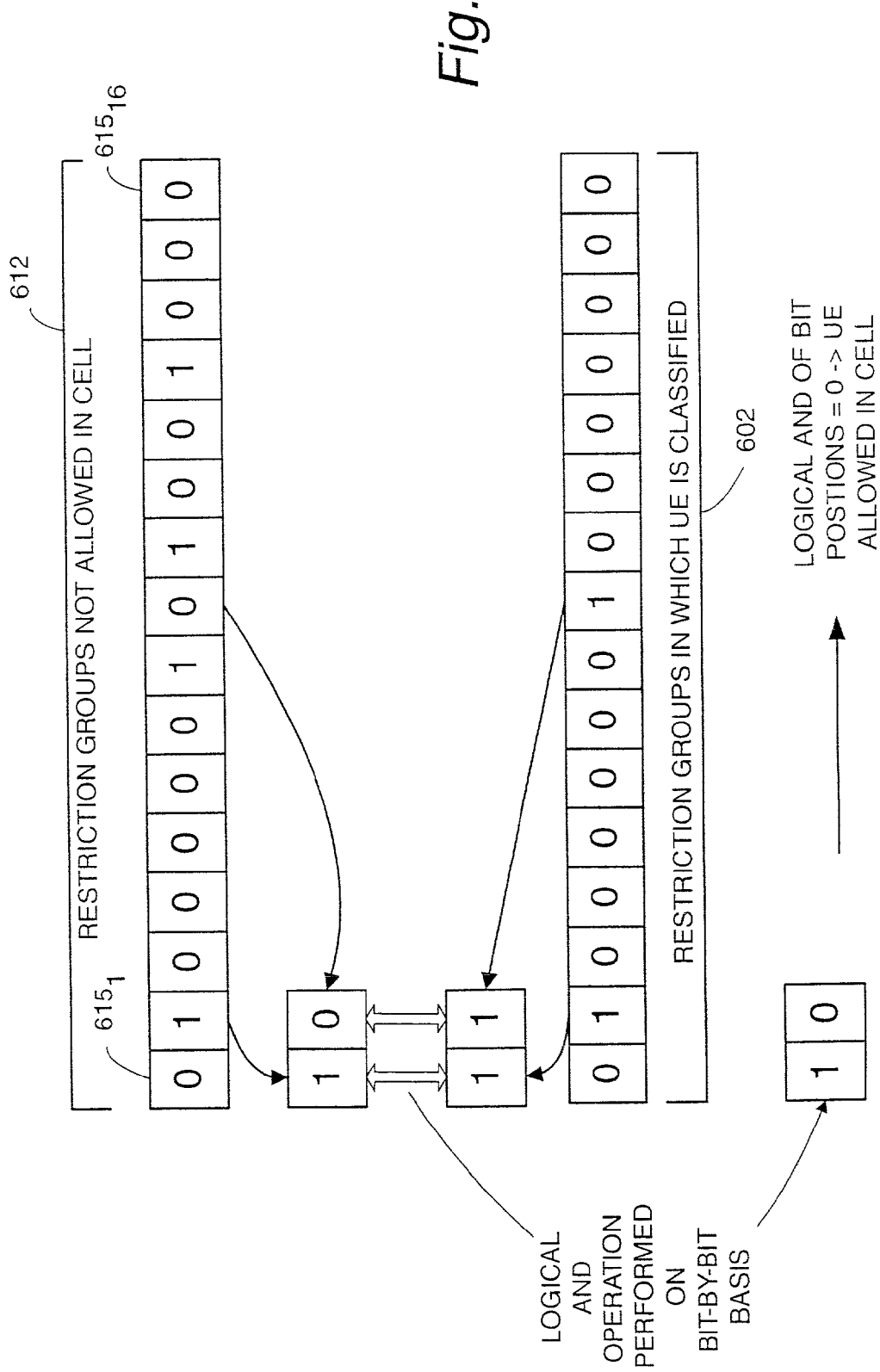
FIG. 7C is a diagrammatic view of fields of a restriction group classification message and a restriction group ineligibility message are formatted as bitmaps, and showing a second technique of access determination.

Another way of conceptualizing or calculating the situation of FIG. 7B is shown in FIG. 7C. FIG. 7 has the same restriction group ineligibility field 612 as FIG. 7B. But as a first step in the FIG. 7C approach, the restriction group classification field 602 is compressed so that a compressed field-ibitmap is formed (shown as the third line of FIG. 7C). The compressed restriction group classification field has only the bit positions of the restriction group classification field 602 which have a non-zero value, e.g., has only the bit positions which indicate to which restriction groups the user equipment unit (UE) does belong. In the particular situation shown in FIG. 7C, only the second and ninth bit positions of the restriction group classification field 602 are extracted to produce the compressed bitmap of the third line of FIG. 7C.

In correlative manner, the bitmap of the restriction group ineligibility field 612 of the first line of FIG. 7C is likewise compressed (as shown in the second line of FIG. 7C) to include only the bit positions thereof which correspond to those extracted to produced the third line of FIG. 7C (e.g., corresponding to the bit positions of the restriction group classification field 602 which have a value of one). In the particular situation shown in FIG. 7C, only the second and ninth bit positions of the restriction group ineligibility field 612 are extracted to produce the compressed bitmap of the second line of FIG. 7C. A logical AND operation is performed between the corresponding bit positions of the second and third lines of FIG. 7C, resulting in the fifth line of FIG. 7C. The result of this first logical AND is 1, 0, 0, for the respective three bit positions. As a last step of the FIG. 7C approach, the bit positions of the fifth line of FIG. 7C are ANDED together as a second logical AND operation. If the result of this second logical AND is zero, then the user equipment unit (UE) is allowed access to the cell. If the result of this second logical AND is one, then the user equipment unit (UE) is not allowed access to the cell.

Thus, in one example generic implementation of the invention the access group eligibility message includes a first bitmap which indicates eligibility for the plural access groups;

while the access group classification message includes a second bitmap which advises the user equipment unit as to which of the plural access groups the user equipment unit belongs. The user equipment unit performs a logical operation with respect to the first bitmap and the second bitmap to determine whether the user equipment unit is allowed access to the cell for which the access group eligibility message is transmitted. In the first example specific implementation (FIG. 7A) the first bitmap indicates which of plural subscriber groups are eligible and the second bitmap indicates to which one(s) of plural subscriber groups the user equipment unit belongs. In a second example specific implementation (FIG. 7B) the first bitmap indicates which of plural restriction groups are ineligible and the second bitmap indicates to which one(s) of plural restriction groups the user equipment unit belongs. In both example specific implementations, the user equipment unit performs a logical AND operation between corresponding bit positions of the first bitmap and the second bitmap.

In one of its aspects, the present invention also accommodates changes of access group classification by a core network. To cater to this capability, the access group classification message includes the access group classification and (optionally) a version field associated with the access group classification.

Figure 8:
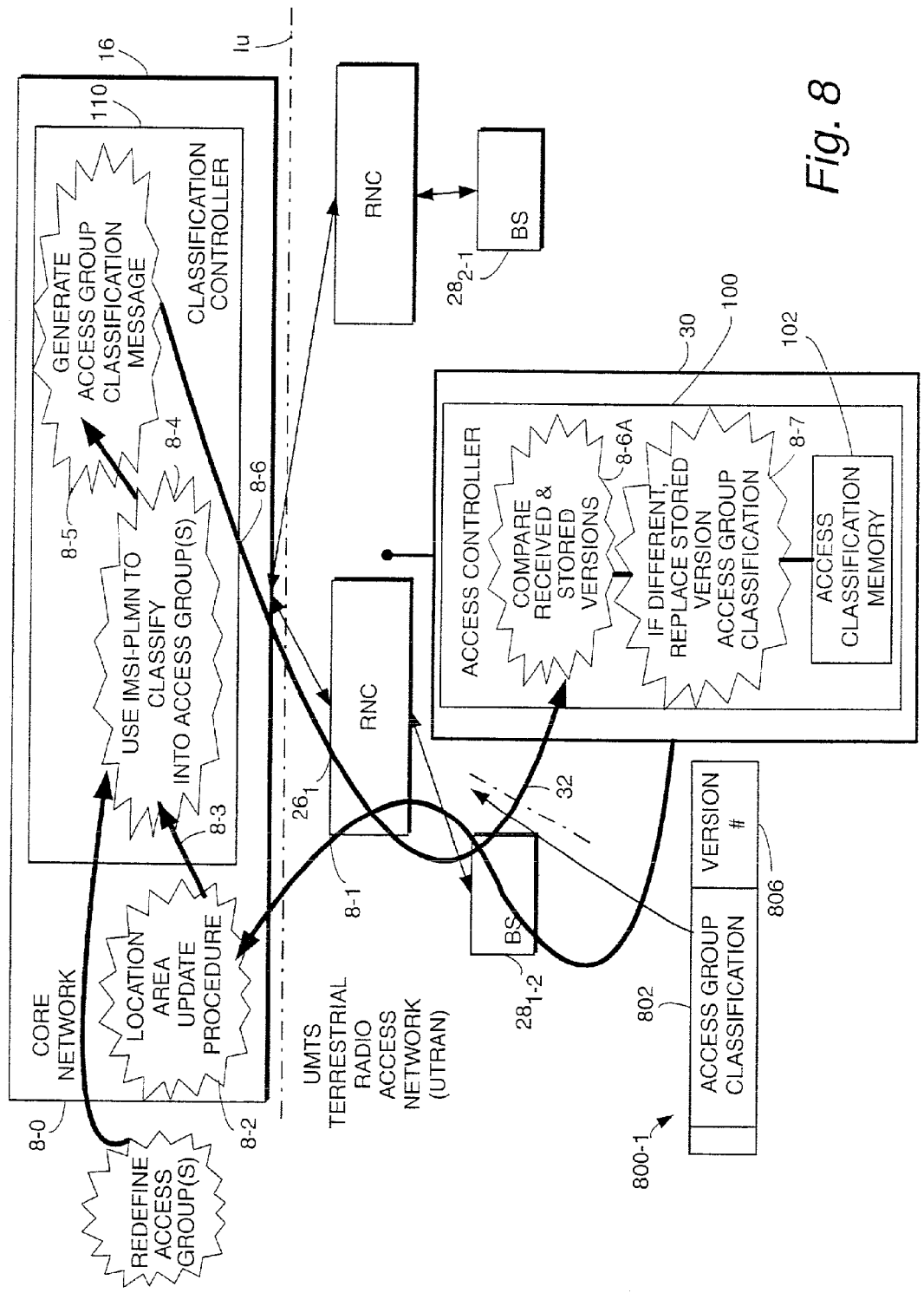
FIG. 8 is a diagrammatic view showing certain basic example actions performed in connection with redefinition of an access group(s) and generation of a revised generic access group classification message in accordance with an example embodiment of the invention.

One example scenario accommodating for changes of access group classification by a core network is illustrated in FIG. 8. FIG. 8 resembles FIG. 3A in many respects, but occurs subsequent to the time shown in FIG. 3A. At the time shown at which the action of FIG. 8 commences, the user equipment unit (UE) 30 has already stored a group access classification in memory 102. The access group classification message from which that group access classification was extracted included a version number field 806. It is assumed that the revision number field 806 included in the access group classification message which conveyed the currently stored group access classification had a version number of "1".

As the action in FIG. 8 begins, at the core network one or more access groups are redefined. Such can occur, for example, by an operator changing the configuration of the subscriber (or restriction) groups, by for example adding or removing an IMSI-PLMN to/from one or more of the subscriber (restriction) groups. At some time after the redefinition of access group(s), the user equipment unit (UE) 30 performs another location update, as indicated by action 8-1, perhaps in connection with movement into a cell served by base station $28_{1\text{-}2}$. In conjunction with the location update procedure 8-2, the classification controller 110 is invoked. The redefinition or change of access group configuration represented by action 8-0 causes (at action 8-5) an updated access group classification to occur (action 8-4), with the result that an updated access group classification message 800-1 is generated (action 8-5), and then transmitted as action 8-6.

In view of the redefinition, the version information is updated in the access group classification message 800-1, e.g., by the version number field 806 now bearing a previous version number (e.g., "2") than previously (the previous value was "1"). Thus, as one non-limiting example, the version number can be, for example, a sequentially incremented number (incremented for each change to the configuration/redefinition).

Upon receipt of the access group classification message 800-1 transmitted as action 8-6, as action 8-6A the classification controller 110 of user equipment unit (UE) 30 compares the version number extracted from field 806 of the access group classification message 800-1 just received with the version number of the group access classification information currently stored in access classification memory 102. If the two version numbers are different, as action 8-7 the classification controller 110 replaces the group access classification information currently stored in access classification memory 102 with the group access classification information in the field 802 of the access group classification message 800-1 just received (in transmission action 8-6).

It will be understood that the foregoing example of generic embodiment of FIG. 8 can be adapted for compatibility with others of the more specific embodiments previously described. For example, when a user equipment unit receives the subscriber (restriction) group information from the core network in the location area update accept or location area update reject messages, it also receives the version number. It stores this number along with the subscriber group information. If the version number received is different from the currently stored information at subsequent location area update accept or location area reject messages, then the user equipment unit knows that the subscriber group definition has changed, and can store the new subscriber group information, otherwise if the version number is the same as the stored version number, then the user equipment unit does not have to store the most recently received subscriber group information, and continues using the stored information in the bitmap tests.

In another of its aspects, the present invention accommodates movement of a user equipment unit into a cell of another core network which has a different access group classification than the core node (the "previous core network") which provided the user equipment unit with the user equipment unit's currently stored access group classification. Here again the access group classification message includes both the access group classification and (optionally) a version field associated with the access group classification.

Figure 9:
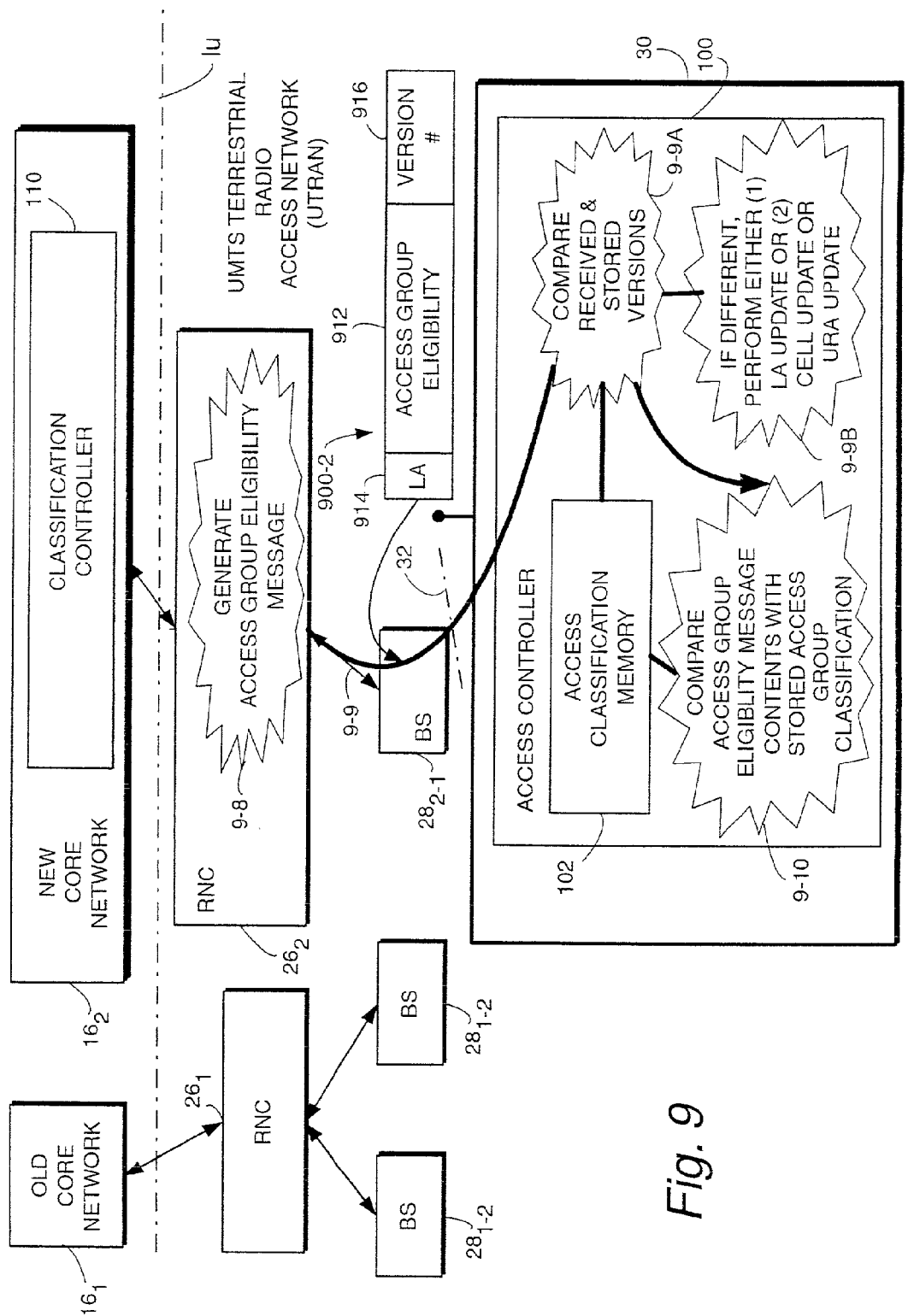
FIG. 9 is a diagrammatic view showing certain basic example actions performed in connection with movement into another core network having a different definition of access group(s) in accordance with an example embodiment of the invention.

One example scenario accommodating for a different access group classification upon entering a new core network is illustrated in FIG. 9. In similar manner with the foregoing, FIG. 9 resembles FIG. 3B in many respects, but shows that the user equipment unit (UE) 30 has just entered a cell served by radio base station $28_{2\text{-}1}$. Importantly, in the situation shown in FIG. 9, the radio base station $28_{2\text{-}1}$, is controlled by radio network controller $26_2$, with radio network controller $26_2$, being connected to a new core network $16_2$, (the user equipment unit (UE) 30 having just left a cell [served by radio base station $28_{1\text{-}2}$] which was involved with old core network $16_1$).

It is assumed in FIG. 9 that the user equipment unit (UE) 30 has already stored a group access classification in memory 102, and in particular a group access classification which was obtained from old core network $16_1$. It is further assumed that the revision number field included in the access group classification message which conveyed the currently stored group access classification (from old core network $16_1$) had a version number of "1". Moreover, it is assumed that the new core network $16_2$, has a different definition of one or more of the access group(s), and that version number "3" is associated with the new core network's definition of the access group(s).

In the FIG. 9 scenario, the user equipment unit (UE) 30 entering a new cell associated with a second core network $16_2$, is in the IDLE mode or in one of the following states of the CONNECTED mode: CELL_FACH state; CELL_PCH state; and URA_PCH state. The new cell is controlled by a radio network controller (RNC), e.g., radio network controller $26_1$, which (as action 9-8) has prepared an access group eligibility message 900-2 for transmission or broadcast in the cell served by radio base station $28_{1\text{-}2}$. The access group eligibility message includes, in its version field 916, the version number "3" associated with the new core network's definition of the access group(s). Of course, the access group eligibility message 900-2 includes a field 912 which comprises a list or other indication of which access groups can (or, conversely, cannot) operate in a cell for which the access group eligibility message is transmitted. In addition, the location area (LA) in which the cell (e.g., cell $C_{2-1}$, in the current example) is included in location area (LA) identifier field 914 which is included in the access group eligibility message.

Figure 10:
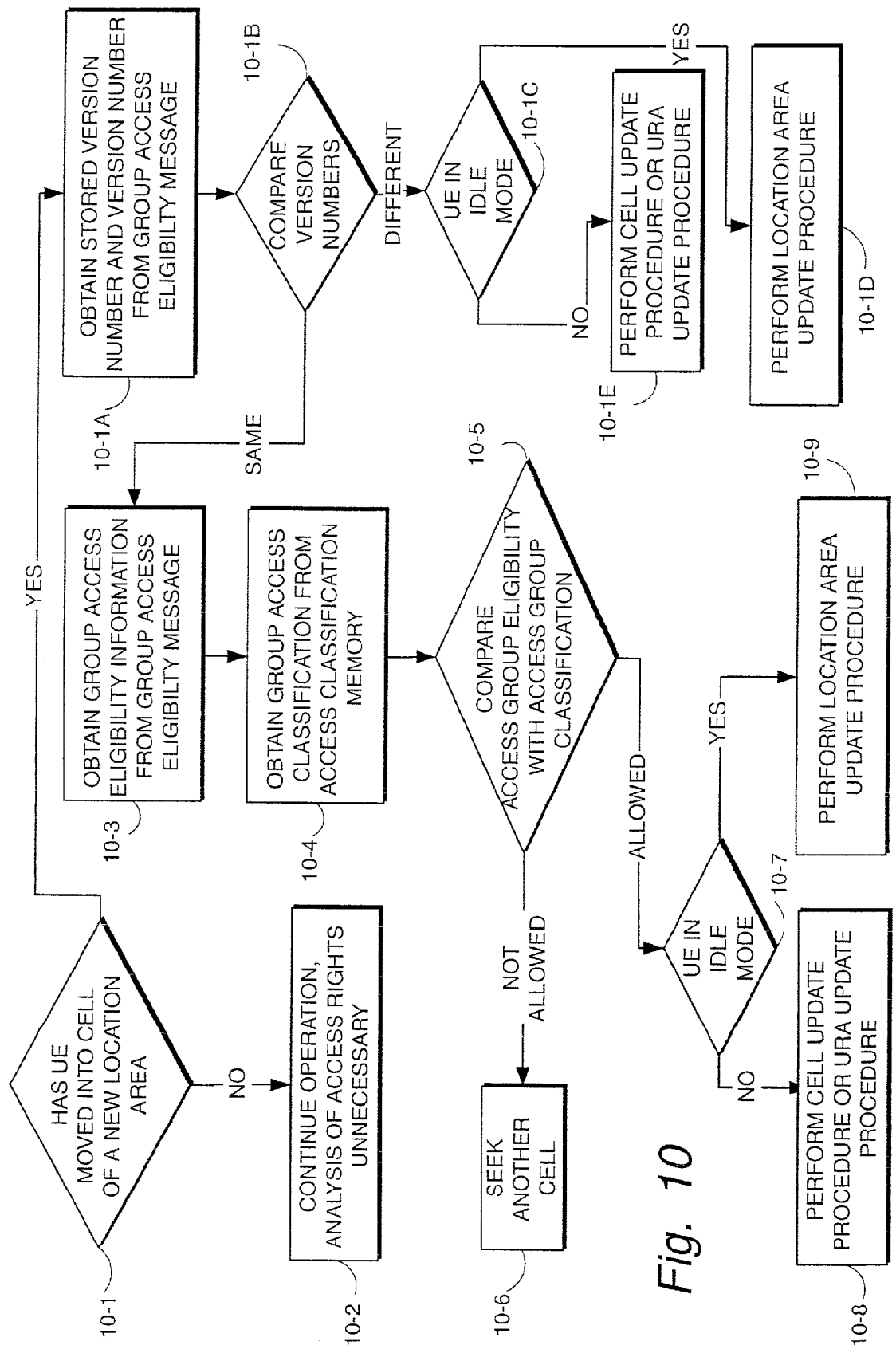
FIG. 10 is a flowchart showing certain basic example steps performed by an access controller of a user equipment unit in analyzing access rights in accordance with an example mode of the present invention involving a change in core networks.

Action 9-9 of FIG. 3B represents transmission (e.g., broadcast) of the access group eligibility message 900-2. In like manner with FIG. 4, FIG. 10 shows various example steps performed by access controller 100 of user equipment unit (UE) 30 upon receipt of the access group eligibility message 900-2. As step 10-1, the access controller 100 of user equipment unit (UE) 30 determines whether the user equipment unit (UE) 30 has moved into a cell which belongs to a new location area (e.g., a new location area relative to the location area of the cell from whence the user equipment unit (UE) 30 just came). If the new cell does not involve a new location area, the user equipment unit essentially continues its operation without need to re-examine the issue of access rights (as depicted by symbol 10-2 in FIG. 10). On the other hand, if the cell is part of a new location area, the remaining steps of FIG. 9 are performed.

As step 10-1A, the access controller 100 obtains the version number from field 916 of the access group eligibility message 900-2 and the version number for the access group classification information currently stored by access classification memory 102. Then, as reflected by step 10-1B in FIG. 9 and action 9-9A in FIG. 9, the access controller 100 compares the version number acquired from field 916 of the access group eligibility message and the version number of the access group classification information currently stored by access classification memory 102.

If the comparison of step 10-1B and action 9-9A determines that the version numbers are the same, the access controller 100 proceeds as step 10-3 to make its own determination whether user equipment unit (UE) 30 has access rights with respect to the new cell (in the new core network $16_2$) into which user equipment unit (UE) 30 has ventured. Such determination is represented both by step 10-5 in FIG. 10 and action 9-10 in FIG. 9, and involves the access controller 100 comparing the contents of the access group eligibility message (e.g., the contents of access group eligibility field 912) with the access group classification for the user equipment unit (UE) 30 as currently stored in access classification memory 102.

If, in the course of the determination of step 10-5 (e.g., action 9-10) the access group eligibility field 912 indicates that the access group to which the user equipment unit (UE) 30 belongs or is affiliated is not entitled to use of the cell, then user equipment unit (UE) 30 must look for another cell in which to operate, as depicted by step 10-6 in FIG. 10. On the other hand, should it be determined at step 10-5 (e.g., action 9-10) that the user equipment unit is permitted in the new location area, the remaining steps of FIG. 10 are performed. These remaining steps, similar to like suffixed steps in FIG. 4, involve the user equipment unit (UE) 30 either performing a location area (LA) update procedure (step 10-9) or either a cell update or a URA update procedure (step 10-8), depending on the mode of the user equipment unit (UE) 30.

If the comparison of step 10-1B and action 9-9A determines that the version numbers are not the same, then different actions/steps are performed in accordance with whether the user equipment unit (UE) 30 is in the IDLE mode or the CONNECTED mode (as discerned as step 10-1C in FIG. 10).

Both of these different actions/steps involve some type of update procedure, and are collectively represented by action 9-9B of FIG. 9.

If the user equipment unit (UE) 30 is ascertained at step 10-1C to be in the IDLE mode, as indicated by STEP 10-1D the user equipment unit will do a location update in the new location area in the new core network $16_2$, anyway (encompassed by action 9-9B in FIG. 9). As a result of the location update in the new location area in the new core network $16_2$, the user equipment unit (UE) 30 will receive the new subscriber group definition and new version number from the new core network, it will store this information in access classification memory 102 and continue in the manner previously described with reference to FIG. 3A and FIG. 3B.

On the other hand, if the user equipment unit (UE) 30 is ascertained at step 10-1C to be in the CONNECTED mode, the user equipment unit will read the new version information from the broadcast channel, realize that it's stored version of the subscriber group may no longer be valid, and rather than perform the bitmap check, will perform cell update or URA update in the new cell anyway (as indicated by STEP 10-1E and encompassed by action 9-9B in FIG. 9). As the UTRAN will also do a double check of the cell update and UTRAN update, based on subscriber/restriction groups in defined in the cell and the subscriber/restriction groups defined per user equipment unit, the user equipment unit will be either accepted or rejected. If rejected, the user equipment unit will go into IDLE mode, and perform a new location update, where it will again receive the new subscriber/restriction group information from the new core network, it can then decide which cell to enter with a location area update.

Thus, the version number can be different between different core networks where those operators have a different meaning to subscriber groups, and the same where those operators have the same definition of subscriber group (i.e., it can be coordinated as such by the co-operating operators). The version number may also be broadcast in all cells in the system, along with the subscriber groups allowed in a cell. When moving between cells controlled by different core networks, if the broadcast version number is the same, then the user equipment unit takes no action.

In view of their optional nature with certain example embodiments of the invention, version number fields are shown in broken lines in the various access group classification messages and the various access group eligibility messages illustrated herein. For example, in FIG. 3A and FIG. 3B, respectively, access group classification message 300-1 has a version number field 306 and access group eligibility message 300-2 has a version number field 316. Similarly, in FIG. 5A and FIG. 5B, respectively, subscriber group classification message 500-1 has a version number field 506 and subscriber group eligibility message 500-2 has a version number field 516. Further, in FIG. 6A and FIG. 6B, respectively, restriction group classification message 600-1 has a version number field 606 and restriction group eligibility message 600-2 has a version number field 616.

The foregoing embodiments including version number are typically subject to two considerations. The first is that the subscriber (or restriction) groups allowed must be the same for all cells in a location area. The second is that a URA is only allowed to overlap between location areas, when the subscriber groups (ore restriction groups) allowed in the cells in the different location areas are the same. Effectively, this means subscriber groups allowed must be the same for all cells in a URA.

As one result of various embodiments of the present invention, advantageously, the signaling between UTRAN and the user equipment unit is greatly reduced. The signaling between the user equipment unit and the core network is also reduced (the user equipment unit will not enter forbidden location areas unnecessarily). Moreover, RRC connections are not dropped unnecessarily. Further, the IDLE mode and CONNECTED mode solutions are aligned.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications network comprising a radio access network which generates and transmits, in a broadcast channel over an air interface, an access group eligibility message which enables a user equipment unit which receives the access group eligibility message to make a determination whether the user equipment unit is eligible to operate or not operate in a cell for which the access group eligibility message is transmitted, the determination involving a comparison of access group eligibility information transmitted in the access group message and an access group classification information, the access group classification information having been generated by a core network node which classified the user equipment unit into at least one of plural access groups;
    wherein the user equipment unit stores the access group classification information obtained from an access group classification message in a memory at the user equipment unit;
    wherein the user equipment unit upon receiving the access group eligibility message compares the stored access group classification with contents of the access group eligibility message to determine on a basis of an access group to which the user equipment unit belongs as indicated by the access group classification information whether the user equipment unit is allowed access to the cell for which the access group eligibility message is transmitted; and
    wherein the access group eligibility message includes a first bitmap which indicates eligibility for the plural access groups; wherein the access group classification message includes a second bitmap which advises the user equipment unit as to which of the plural access groups the user equipment unit belongs.

2. The apparatus of claim 1, wherein the access group eligibility message indicates what subscriber groups are eligible to operate in the cell for which the access group eligibility message is transmitted.

3. The apparatus of claim 1, wherein the access group eligibility message indicates what restriction groups are not eligible to operate in the cell for which the access group eligibility message is transmitted.

4. The apparatus of claim 1, wherein the access group eligibility message includes a bitmap which indicates eligibility for plural access groups.

5. The apparatus of claim 1, wherein the core network node, upon receipt of a location update request for the user equipment unit, classifies the user equipment unit in the at least one of plural access groups and generates for transmission to the user equipment unit through the radio access network an access group classification message which advises the user equipment unit as to which of the plural access groups the user equipment unit belongs.

6. The apparatus of claim 1, wherein the user equipment unit performs a logical operation with respect to the first bitmap and the second bitmap to determine whether the user equipment unit is allowed access to the cell for which the access group eligibility message is transmitted.

7. The apparatus of claim 6, wherein the first bitmap indicates which of plural subscriber groups are eligible and the second bitmap indicates to which one(s) of plural subscriber groups the user equipment unit belongs, and wherein the logical operation is a logical AND operation between corresponding bit positions of the first bitmap and the second bitmap.

8. The apparatus of claim 6, wherein the first bitmap indicates which of plural restriction groups are ineligible and the second bitmap indicates to which one(s) of plural restriction groups the user equipment unit belongs, and wherein the logical operation is a logical AND operation between corresponding bit positions of the first bitmap and the second bitmap.

9. The apparatus of claim 1, wherein the user equipment unit is in one of an IDLE mode and one of the following states of a CONNECTED mode:
    CELL_FACH state; CELL_PCH state; and URA_PCH state.

10. The apparatus of claim 1, wherein upon entering a new cell which involves a transition to a new location area, the user equipment unit checks the access group eligibility message transmitted for the new cell in order to compare the stored access group classification information with contents of the access group eligibility message to determine whether the user equipment unit is allowed access to the new cell.

11. The apparatus of claim 10,
    wherein upon entering a new cell which does not involve a transition to a new location area, the user equipment unit need not check the access group eligibility message to determine whether the user equipment unit is allowed access to the new cell.

12. The apparatus of claim 11, wherein the access group classification information is transmitted in an access group classification message which comprises one of a location update response and a location update reject message which includes the access group classification information.

13. The apparatus of claim 1, wherein the access group eligibility information comprises a subscriber group having a composition pre-agreed with a network operator.

14. The apparatus of claim 1, wherein the access group classification is received individually by the user equipment unit, and wherein the user equipment unit is configured to make the determination whether the user equipment unit is eligible to operate or not in the cell without the user equipment unit establishing a connection with the radio access network.

15. A telecommunications network comprising a radio access network which generates and transmits, in a broadcast channel over an air interface, an access group eligibility message which enables a user equipment unit which receives the access group eligibility message to make a determination whether the user equipment unit is eligible to operate or not operate in a cell for which the access group eligibility message is transmitted, the determination involving a comparison of access group eligibility information transmitted in the access group message and an access group classification, the access group classification having been generated by a core network node which classified the user equipment unit into at least one of plural access groups;
    wherein the access group classification message is one of a location update response and a location update reject message which includes the access group classification and a version field associated with the access group classification;

wherein upon receiving a subsequent core network message in the form of one of a location update response or location update reject message, the subsequent core network message including a potentially revised access group classification and a version field associated with the access group classification carried by the subsequent core network message, the user equipment unit determines, by comparing contents of the version field associated with the access group classification and the version field associated with the access group classification carried by the subsequent core network message, whether the user equipment unit should update its stored access group classification.

16. A telecommunications network comprising a radio access network which generates and transmits, in a broadcast channel over an air interface, an access group eligibility message which enables a user equipment unit which receives the access group eligibility message to make a determination whether the user equipment unit is eligible to operate or not operate in a cell for which the access group eligibility message is transmitted, the determination involving a comparison of access group eligibility information transmitted in the access group message and an access group classification, the access group classification having been generated by a core network node which classified the user equipment unit into at least one of plural access groups wherein the access group classification message generated by the core network includes the access group classification and a version field associated with the access group classification;

wherein upon entering a new cell associated with a second core network, the user equipment unit receives an access group eligibility message transmitted for the new cell, the access group eligibility message transmitted for the new cell including a version field associated with the contents of the access group eligibility message transmitted for the new cell, and wherein the user equipment unit determines, by comparing contents of the version field associated with the access group classification and the version field associated with the access group eligibility message transmitted for the new cell, whether the user equipment unit should update its stored access group classification.

17. A user equipment unit which receives over an air interface an access group classification message and an access group eligibility message, the access group classification message being generated by a core network node for advising the user equipment unit as to which of the plural access groups the user equipment unit belongs, the access group eligibility message being generated by a radio access network node for specifying eligibility of plural access groups to operate or not operate in a cell for which the access group eligibility message is transmitted, the user equipment unit comprising:

an access controller which stores an access group classification information obtained from the access group eligibility message and which compares the stored access group classification with contents of the access group eligibility message to determine on a basis of an access group to which the user equipment unit belongs as indicated by the access group classification information whether the user equipment unit is allowed access to the cell for which the access group eligibility message is transmitted;

wherein the access group eligibility message includes a bitmap which indicates eligibility for plural access groups;

wherein the access group eligibility message includes a first bitmap which indicates eligibility for the plural access groups; wherein the access group classification message includes a second bitmap which advises the user equipment unit as to which of the plural access groups the user equipment unit belongs; and wherein the user equipment unit performs a logical operation with respect to the first bitmap and the second bitmap to determine whether the user equipment unit is allowed access to the cell for which the access group eligibility message is transmitted.

18. The apparatus of claim 17, wherein the access group eligibility message indicates what subscriber groups are eligible to operate in the cell for which the access group eligibility message is transmitted.

19. The apparatus of claim 17, wherein the access group eligibility message indicates what restriction groups are not eligible to operate in the cell for which the access group eligibility message is transmitted.

20. The apparatus of claim 17, wherein the access group eligibility message includes a bitmap which indicates eligibility for plural access groups.

21. The apparatus of claim 17, wherein the first bitmap indicates which of plural subscriber groups are eligible and the second bitmap indicates to which one(s) of plural subscriber groups the user equipment unit belongs, and wherein the logical operation is a logical AND operation between corresponding bit positions of the first bitmap and the second bitmap.

22. The apparatus of claim 17, wherein the first bitmap indicates which of plural restriction groups are ineligible and the second bitmap indicates to which one(s) of plural restriction groups the user equipment unit belongs, and wherein the logical operation is a logical AND operation between corresponding bit positions of the first bitmap and the second bitmap.

23. The apparatus of claim 17, wherein the access group classification message is one of a location update response and a location update reject message which includes the access group classification information.

24. The apparatus of claim 17, wherein the access group classification message includes the access group classification information and a version field associated with the access group classification information.

25. The apparatus of claim 17, wherein the access group eligibility information comprises a subscriber group having a composition pre-agreed with a network operator.

26. The apparatus of claim 17, wherein the access group classification information is received individually by the user equipment unit, and wherein the user equipment unit is configured to make the determination whether the user equipment unit is eligible to operate or not in the cell without the user equipment unit establishing a connection with the radio access network.

27. A user equipment unit which receives over an air interface an access group classification message and an access group eligibility message, the access group classification message being generated by a core network node for advising the user equipment unit as to which of the plural access groups the user equipment unit belongs, the access group eligibility message being generated by a radio access network node for specifying eligibility of plural access groups to operate or not operate in a cell for which the access group eligibility message is transmitted, the user equipment unit comprising:

an access controller which stores an access group classification obtained from the access group eligibility message and which compares the stored access group classification with contents of the access group eligibility message to determine whether the user equipment unit is allowed access to the cell for which the access group eligibility message is transmitted;

wherein the access group classification message includes the access group classification and a version field associated with the access group classification;

wherein upon receiving a subsequent core network message, the subsequent core network message including a potentially revised access group classification and a version field associated with the access group classification carried by the subsequent core network message, the access controller determines, by comparing contents of the version field associated with the access group classification and the version field associated with the access group classification carried by the subsequent core network message, whether the user equipment unit should update its stored access group classification.

28. A user equipment unit which receives over an air interface an access group classification message and an access group eligibility message, the access group classification message being generated by a core network node for advising the user equipment unit as to which of the plural access groups the user equipment unit belongs, the access group eligibility message being generated by a radio access network node for specifying eligibility of plural access groups to operate or not operate in a cell for which the access group eligibility message is transmitted, the user equipment unit comprising:

an access controller which stores an access group classification obtained from the access group eligibility message and which compares the stored access group classification with contents of the access group eligibility message to determine whether the user equipment unit is allowed access to the cell for which the access group eligibility message is transmitted;

wherein the access group classification message includes the access group classification and a version field associated with the access group classification;

wherein upon entering a new cell associated with a second core network, the user equipment unit receives an access group eligibility message transmitted for the new cell, the access group eligibility message transmitted for the new cell including a version field associated with the contents of the access group eligibility message transmitted for the new cell, and wherein the access controller determines, by comparing contents of the version field associated with the access group classification and the version field associated with the access group eligibility message transmitted for the new cell, whether the user equipment unit should update its stored access group classification.

29. A method of operating a telecommunications network comprising:

transmitting, in a broadcast channel over an air interface, an access group eligibility message generated by a radio access network;

receiving the access group eligibility message at a user equipment unit; the user equipment unit using the access group eligibility message to make a determination on a basis of an access group to which the user equipment unit belongs as indicated by access group classification information whether the user equipment unit is eligible to operate or not operate in a cell for which the access group eligibility message is transmitted, the determination involving a comparison of access group eligibility information transmitted in the access group message and the access group classification information which is generated by a core network node;

further comprising storing in a memory at the user equipment unit the access group classification information obtained from an access group classification message;

the user equipment unit, upon receiving the access group eligibility message, comparing the stored access group classification information with contents of the access group eligibility message to determine whether the user equipment unit is allowed access to the cell for which the access group eligibility message is transmitted; and including in the access group eligibility message a first bitmap which indicates eligibility for the plural access groups; and including in the access group classification message a second bitmap which advises the user equipment unit as to which of the plural access groups the user equipment unit belongs.

30. The method of claim 29, further comprising including in the access group eligibility message an indication of what subscriber groups are eligible to operate in the cell for which the access group eligibility message is transmitted.

31. The method of claim 29, further comprising including in the access group eligibility message an indication of what restriction groups are not eligible to operate in the cell for which the access group eligibility message is transmitted.

32. The method of claim 29, further comprising including in the access group eligibility message a bitmap which indicates eligibility for plural access groups.

33. The method of claim 29, further comprising:
using a radio access network node to transmit the access group eligibility message;
at a core network node and upon receipt of a location update request for the user equipment unit, classifying the user equipment unit in at least one of plural access groups;
generating, for transmission to the user equipment unit through a radio access network, an access group classification message which advises the user equipment unit as to which of the plural access groups the user equipment unit belongs.

34. The method of claim 29, further comprising storing in a memory at the user equipment unit the access group classification obtained from an access group classification message.

35. The method of claim 29, further comprising performing a logical operation with respect to the first bitmap and the second bitmap to determine whether the user equipment unit is allowed access to the cell for which the access group eligibility message is transmitted.

36. The method of claim 35, wherein the first bitmap indicates which of plural subscriber groups are eligible and the second bitmap indicates to which one(s) of plural subscriber groups the user equipment unit belongs, and wherein the logical operation is a logical AND operation between corresponding bit positions of the first bitmap and the second bitmap.

37. The method of claim 35, wherein the first bitmap indicates which of plural restriction groups are ineligible and the second bitmap indicates to which one(s) of plural restriction groups the user equipment unit belongs, and wherein the logical operation is a logical AND operation between corresponding bit positions of the first bitmap and the second bitmap.

38. The method of claim 29, wherein the user equipment unit is in one of an IDLE mode and one of the following states of a CONNECTED mode:
CELL_FACH state; CELL_PCH state; and URA_PCH state.

39. The method of claim 29, further comprising:
upon the user equipment unit entering a new cell which involves a transition to a new location area, checking the access group eligibility message transmitted for the new cell; and
comparing the stored access group classification with contents of the access group eligibility message to determine whether the user equipment unit is allowed access to the new cell.

40. The method of claim 39, further comprising, upon the user equipment unit entering a new cell which does not involve a transition to a new location area, the user equipment unit not checking the access group eligibility message.

41. The method of claim 29, wherein the access group classification information is transmitted in an access group classification message which comprises one of a location update response and a location update reject message which includes the access group classification information.

42. The method of claim 29, further comprising including in an access group classification message the access group classification and a version field associated with the access group classification information.

43. The method of claim 29, wherein the access group eligibility information comprises a subscriber group having a composition pre-agreed with a network operator.

44. The method of claim 29, further comprising:
the access group classification information being received individually by the user equipment unit, and
the user equipment unit making the determination whether the user equipment unit is eligible to operate or not in the cell without the user equipment unit establishing a connection with the radio access network.

45. A method of operating a telecommunications network comprising:
transmitting, in a broadcast channel over an air interface, an access group eligibility message generated by a radio access network;
receiving the access group eligibility message at a user equipment unit;
the user equipment unit using the access group eligibility message to make a determination whether the user equipment unit is eligible to operate or not operate in a cell for which the access group eligibility message is transmitted, the determination involving a comparison of access group eligibility information transmitted in the access group message and an access group classification which is generated by a core network node;
including in an access group classification message the access group classification and a version field associated with the access group classification;
the user equipment unit receiving a subsequent core network message in the form of one of a location update response or location update reject message, the subsequent core network message including a potentially revised access group classification and a version field associated with the access group classification carried by the subsequent core network message;
the user equipment unit determining, by comparing contents of the version field associated with the access group classification and the version field associated with the access group classification carried by the subsequent core network message, whether the user equipment unit should update its stored access group classification.

46. A method of operating a telecommunications network comprising:
transmitting, in a broadcast channel over an air interface, an access group eligibility message generated by a radio access network;
receiving the access group eligibility message at a user equipment unit;
the user equipment unit using the access group eligibility message to make a determination whether the user equipment unit is eligible to operate or not operate in a cell for which the access group eligibility message is transmitted, the determination involving a comparison of access group eligibility information transmitted in the access group message and an access group classification which is generated by a core network node;
wherein an access group classification message generated by the core network includes the access group classification and a version field associated with the access group classification;
upon the user equipment unit entering a new cell associated with a second core network:
the user equipment unit receiving an access group eligibility message transmitted for the new cell, the access group eligibility message transmitted for the new cell including a version field associated with the contents of the access group eligibility message transmitted for the new cell; and
the user equipment unit determining, by comparing contents of the version field associated with the access group classification and the version field associated with the access group eligibility message transmitted for the new cell, whether the user equipment unit should update its stored access group classification.

\* \* \* \* \*

UNITED STATES PATENT AND TRADEMARK OFFICE
CERTIFICATE OF CORRECTION

PATENT NO. : 7,957,721 B2  
APPLICATION NO. : 10/068001  
DATED : June 7, 2011  
INVENTOR(S) : Hogan et al.

Page 1 of 2

It is certified that error appears in the above-identified patent and that said Letters Patent is hereby corrected as shown below:

On the Title Page, Item (75), under "Inventors", in Column 1, Line 2, delete "VS Neede(NL)" and insert -- Neede(NL) --, therefor.

On the Title Page, in the figure, for Tag "20", in Line 1, delete "GRPS" and insert -- GPRS --, therefor.

On Title Page 2, Item (56), under "OTHER PUBLICATIONS", in Column 2, Line 33, delete "Omnbus" and insert -- Omnibus --, therefor.

In Fig. 1, Sheet 1 of 15, for Tag "20", in Line 1, delete "GRPS" and insert -- GPRS --, therefor.

In Fig. 3B, Sheet 4 of 15, for Tag "3-10", in Line 3, delete "ELIGIBLITY" and insert -- ELIGIBILITY --, therefor.

In Fig. 4, Sheet 5 of 15, for Tag "4-3", in Line 4, delete "ELIGIBILTY" and insert -- ELIGIBILITY --, therefor.

In Fig. 5B, Sheet 7 of 15, for Tag "5-10", in Line 3, delete "ELIGIBLITY" and insert -- ELIGIBILITY --, therefor.

In Fig. 6B, Sheet 9 of 15, for Tag "6-10", in Line 3, delete "INELIGIBLITY" and insert -- INELIGIBILITY --, therefor.

In Fig. 10, Sheet 15 of 15, for Tag "10-3", in Line 4, delete "ELIGIBILTY" and insert -- ELIGIBILITY --, therefor.

In Fig. 10, Sheet 15 of 15, for Tag "10-1A", in Line 4, delete "ELIGIBILTY" and insert -- ELIGIBILITY --, therefor.

Signed and Sealed this  
Thirteenth Day of March, 2012

David J. Kappos  
*Director of the United States Patent and Trademark Office*

CERTIFICATE OF CORRECTION (continued)
U.S. Pat. No. 7,957,721 B2

In Column 2, Line 43, delete "X.25," and insert -- X.25 --, therefor.

In Column 3, Line 29, delete "In" and insert -- Iu --, therefor.

In Column 4, Lines 38-39, delete "09/932,447,, filed Aug. 20, 2011,," and insert -- 09/932,447, filed Aug. 20, 2011, --, therefor.

In Column 4, Line 52, delete "60/317,970,," and insert -- 60/317,970, --, therefor.

In Column 11, Line 33, delete "analzying" and insert -- analyzing --, therefor.

In Column 13, Line 21, delete "25.331," and insert -- 25.331 --, therefor.

In Column 15, Line 16, delete "1,," and insert -- 1, --, therefor.

In Column 15, Line 18, delete "0,," and insert -- 0, --, therefor.

In Column 16, Lines 34-35, delete "fieldibitmap" and insert -- field/bitmap --, therefor.

In Column 20, Lines 49-50, delete "FIG. SA and FIG. SB," and insert -- FIG. 5A and FIG. 5B, --, therefor.